(12) United States Patent
Chatterjee et al.

(10) Patent No.: US 9,788,186 B2
(45) Date of Patent: Oct. 10, 2017

(54) SIGNALING FOR PROXIMITY SERVICES AND D2D DISCOVERY IN AN LTE NETWORK

(71) Applicant: Intel IP Corporation, Santa Clara, CA (US)

(72) Inventors: Debdeep Chatterjee, Santa Clara, CA (US); Youn Hyoung Heo, Seoul (KR); Huaning Niu, Milpitas, CA (US); Gang Xiong, Beaverton, OR (US); Hong He, Beijing (CN); Alexey Khoryaev, Dzerzhinsk (RU); Sergey Panteleev, Nizhny Novgorod (RU)

(73) Assignee: Intel IP Corporation, Santa Clara, CA (US)

( * ) Notice: Subject to any disclaimer, the term of this patent is extended or adjusted under 35 U.S.C. 154(b) by 229 days.

(21) Appl. No.: 14/314,957

(22) Filed: Jun. 25, 2014

(65) Prior Publication Data
US 2015/0043448 A1    Feb. 12, 2015

Related U.S. Application Data

(60) Provisional application No. 61/863,902, filed on Aug. 8, 2013, provisional application No. 61/909,938, filed on Nov. 27, 2013.

(51) Int. Cl.
*H04W 8/00*        (2009.01)
*H04W 72/08*    (2009.01)
(Continued)

(52) U.S. Cl.
CPC ........... *H04W 8/005* (2013.01); *H04W 4/005* (2013.01); *H04W 4/008* (2013.01); *H04W 48/12* (2013.01);
(Continued)

(58) Field of Classification Search
None
See application file for complete search history.

(56) References Cited

U.S. PATENT DOCUMENTS 8,265,065 B2    9/2012    Xu
8,903,419 B2    12/2014    Yu et al.
(Continued)

FOREIGN PATENT DOCUMENTS

CN    106162533 A    11/1923
CN    101632319 A    1/2010
(Continued)

OTHER PUBLICATIONS

"U.S. Appl. No. 14/280,799, Non Final Office Action dated Jul. 13, 2015", 34 pgs.
(Continued)

*Primary Examiner* — Christopher Crutchfield
*Assistant Examiner* — Tito Pham
(74) *Attorney, Agent, or Firm* — Schwegman Lundberg & Woessner, P.A.

(57) ABSTRACT

Embodiments of an enhanced node B (eNB), user equipment (UE) and methods of signaling for proximity services and device-to-device (D2D) discovery in an LTE network are generally described herein. In some embodiments, the eNB may transmit signaling to indicate D2D discovery zone configuration to proximity service (ProSe) enabled UEs. The signaling may indicate time and frequency resources and a periodicity of a discovery zone and may indicate operational parameters for the discovery zone. The resources of the D2D discovery zone may be allocated for D2D discovery signal transmission by the ProSe-enabled UEs.

26 Claims, 4 Drawing Sheets

(51) Int. Cl.
*H04W 4/00* (2009.01)
*H04W 48/12* (2009.01)
*H04W 72/02* (2009.01)
*H04W 76/02* (2009.01)
*H04W 76/04* (2009.01)
*H04W 48/16* (2009.01)
*H04W 4/02* (2009.01)

(52) U.S. Cl.
CPC ............ *H04W 48/16* (2013.01); *H04W 72/02* (2013.01); *H04W 72/08* (2013.01); *H04W 76/023* (2013.01); *H04W 76/046* (2013.01); *H04W 4/023* (2013.01)

(56) References Cited

U.S. PATENT DOCUMENTS

| | | | |
|---|---|---|---|
| 9,042,938 | B2 | 5/2015 | Nimbalker |
| 9,154,267 | B2 | 10/2015 | He et al. |
| 9,326,122 | B2 | 4/2016 | Xiong et al. |
| 9,363,739 | B2 | 6/2016 | Yu et al. |
| 9,450,667 | B2 | 9/2016 | Lin et al. |
| 9,479,918 | B2 | 10/2016 | Yu et al. |
| 9,499,995 | B2 | 11/2016 | Yakub et al. |
| 9,504,088 | B2 | 11/2016 | Xiong et al. |
| 9,554,406 | B2 | 1/2017 | Lin et al. |
| 9,559,761 | B2 | 1/2017 | Luft et al. |
| 9,560,513 | B2 | 1/2017 | Lu et al. |
| 9,560,574 | B2 | 1/2017 | Chatterjee et al. |
| 9,564,958 | B2 | 2/2017 | Martinez Tarradell et al. |
| 2006/0293061 | A1 | 12/2006 | Kobayashi et al. |
| 2007/0019578 | A1 | 1/2007 | Meiri |
| 2007/0165593 | A1 | 7/2007 | Hundal et al. |
| 2007/0297523 | A1 | 12/2007 | Cattaneo et al. |
| 2008/0019343 | A1 | 1/2008 | Benveniste |
| 2008/0063106 | A1 | 3/2008 | Hahm et al. |
| 2008/0119130 | A1 | 5/2008 | Sinha |
| 2008/0123591 | A1 | 5/2008 | Jung et al. |
| 2008/0232798 | A1 | 9/2008 | Kasezawa |
| 2008/0267162 | A1 | 10/2008 | Benveniste |
| 2009/0122736 | A1 | 5/2009 | Damnjanovic et al. |
| 2009/0264142 | A1 | 10/2009 | Sankar et al. |
| 2009/0305693 | A1 | 12/2009 | Shimomura et al. |
| 2009/0327395 | A1 | 12/2009 | Park et al. |
| 2010/0260169 | A1 | 10/2010 | Gheorghiu et al. |
| 2011/0028102 | A1 | 2/2011 | Li et al. |
| 2011/0080873 | A1 | 4/2011 | Zhang et al. |
| 2011/0199905 | A1 | 8/2011 | Pinheiro et al. |
| 2011/0250913 | A1 | 10/2011 | Vajapeyam et al. |
| 2011/0268101 | A1 | 11/2011 | Wang et al. |
| 2011/0274040 | A1 | 11/2011 | Pani et al. |
| 2012/0033613 | A1 | 2/2012 | Lin et al. |
| 2012/0039321 | A1 | 2/2012 | Ghosh et al. |
| 2012/0064902 | A1 | 3/2012 | Kronander et al. |
| 2012/0077510 | A1 | 3/2012 | Chen et al. |
| 2012/0087247 | A1 | 4/2012 | Min et al. |
| 2012/0093098 | A1 | 4/2012 | Charbit et al. |
| 2012/0113934 | A1* | 5/2012 | Ko .................. H04B 7/043 370/329 |
| 2012/0115518 | A1 | 5/2012 | Zeira et al. |
| 2012/0163235 | A1 | 6/2012 | Ho et al. |
| 2012/0163311 | A1 | 6/2012 | Park |
| 2012/0184306 | A1* | 7/2012 | Zou .................. H04W 76/023 455/458 |
| 2012/0207073 | A1 | 8/2012 | Kim et al. |
| 2012/0213109 | A1 | 8/2012 | Xu et al. |
| 2012/0243431 | A1* | 9/2012 | Chen .............. H04W 72/0406 370/252 |
| 2012/0249372 | A1 | 10/2012 | Jovicic et al. |
| 2012/0252442 | A1 | 10/2012 | Fu et al. |
| 2012/0270584 | A1* | 10/2012 | Liang .............. H04W 48/16 455/507 |
| 2012/0275365 | A1 | 11/2012 | Anderson et al. |
| 2012/0275366 | A1 | 11/2012 | Anderson et al. |
| 2012/0294165 | A1 | 11/2012 | Turtinen et al. |
| 2012/0307748 | A1 | 12/2012 | Cheng et al. |
| 2012/0309419 | A1* | 12/2012 | Lee .................. H04W 74/008 455/456.1 |
| 2013/0017779 | A1 | 1/2013 | Song et al. |
| 2013/0028235 | A1 | 1/2013 | Barrett |
| 2013/0044623 | A1 | 2/2013 | Speight et al. |
| 2013/0058306 | A1* | 3/2013 | Noh .................. H04L 1/1671 370/329 |
| 2013/0064187 | A1 | 3/2013 | Patil et al. |
| 2013/0066966 | A1 | 3/2013 | Patil et al. |
| 2013/0077594 | A1 | 3/2013 | Park et al. |
| 2013/0080597 | A1 | 3/2013 | Liao |
| 2013/0083779 | A1 | 4/2013 | Ahn et al. |
| 2013/0107727 | A1 | 5/2013 | Lunden et al. |
| 2013/0109301 | A1 | 5/2013 | Hakola et al. |
| 2013/0114472 | A1 | 5/2013 | Tamaki et al. |
| 2013/0160101 | A1 | 6/2013 | Hakola et al. |
| 2013/0170347 | A1 | 7/2013 | Zhang et al. |
| 2013/0188546 | A1 | 7/2013 | Turtinen et al. |
| 2013/0194941 | A1 | 8/2013 | Lu et al. |
| 2013/0194991 | A1 | 8/2013 | Vannithamby et al. |
| 2013/0195026 | A1 | 8/2013 | Johnsson et al. |
| 2013/0223356 | A1* | 8/2013 | Khoshnevis ........ H04W 72/042 370/329 |
| 2013/0230035 | A1 | 9/2013 | Grandhi et al. |
| 2013/0242866 | A1 | 9/2013 | Lin et al. |
| 2013/0288608 | A1* | 10/2013 | Fwu .................. H04W 72/02 455/63.1 |
| 2013/0294399 | A1 | 11/2013 | Lee |
| 2013/0301492 | A1* | 11/2013 | Ji .................. H04L 5/14 370/280 |
| 2013/0301570 | A1 | 11/2013 | Xu et al. |
| 2013/0310100 | A1 | 11/2013 | Lee et al. |
| 2013/0322276 | A1 | 12/2013 | Pelletier et al. |
| 2013/0329711 | A1 | 12/2013 | Seo et al. |
| 2013/0331137 | A1 | 12/2013 | Burchill et al. |
| 2013/0336229 | A1 | 12/2013 | Kakadia et al. |
| 2014/0003262 | A1* | 1/2014 | He .................. H04W 28/08 370/252 |
| 2014/0003348 | A1 | 1/2014 | Velev et al. |
| 2014/0010179 | A1 | 1/2014 | Lee |
| 2014/0016614 | A1 | 1/2014 | Velev et al. |
| 2014/0031054 | A1 | 1/2014 | Zou et al. |
| 2014/0036876 | A1* | 2/2014 | Li .................. H04W 24/04 370/336 |
| 2014/0044000 | A1 | 2/2014 | Charbit et al. |
| 2014/0056220 | A1 | 2/2014 | Poitau et al. |
| 2014/0066018 | A1 | 3/2014 | Zhu |
| 2014/0066058 | A1 | 3/2014 | Yu et al. |
| 2014/0079016 | A1 | 3/2014 | Dai et al. |
| 2014/0082185 | A1 | 3/2014 | Abraham et al. |
| 2014/0084543 | A1 | 3/2014 | Snow et al. |
| 2014/0094183 | A1* | 4/2014 | Gao .................. H04W 72/048 455/450 |
| 2014/0185529 | A1* | 7/2014 | Lim .................. H04W 76/023 370/328 |
| 2014/0187283 | A1 | 7/2014 | Nimbalker et al. |
| 2014/0213186 | A1* | 7/2014 | Gage .................. H04W 4/023 455/41.2 |
| 2014/0213259 | A1* | 7/2014 | Teyeb .................. H04W 48/16 455/436 |
| 2014/0241260 | A1* | 8/2014 | Schmidt .............. H04W 76/023 370/329 |
| 2014/0248917 | A1 | 9/2014 | Scipione et al. |
| 2014/0269494 | A1 | 9/2014 | Zhu et al. |
| 2014/0269558 | A1 | 9/2014 | Sartori et al. |
| 2014/0328329 | A1 | 11/2014 | Novlan et al. |
| 2014/0334380 | A1 | 11/2014 | Pinheiro et al. |
| 2014/0335867 | A1 | 11/2014 | Hsu et al. |
| 2014/0370904 | A1 | 12/2014 | Smith et al. |
| 2014/0378157 | A1 | 12/2014 | Wei et al. |
| 2015/0009883 | A1 | 1/2015 | Bai et al. |
| 2015/0016312 | A1 | 1/2015 | Li et al. |
| 2015/0031359 | A1 | 1/2015 | Yu et al. |
| 2015/0036519 | A1 | 2/2015 | Kazmi et al. |
| 2015/0043403 | A1 | 2/2015 | Martinez Tarradell et al. |
| 2015/0043445 | A1 | 2/2015 | Xiong et al. |
| 2015/0043449 | A1 | 2/2015 | Bangolae et al. |

(56) References Cited

U.S. PATENT DOCUMENTS

| | | |
|---|---|---|
| 2015/0043541 A1 | 2/2015 | Blankenship et al. |
| 2015/0043687 A1 | 2/2015 | Luo et al. |
| 2015/0045016 A1 | 2/2015 | Xiong et al. |
| 2015/0055588 A1 | 2/2015 | Yerramalli et al. |
| 2015/0056931 A1 | 2/2015 | Yerramalli et al. |
| 2015/0063148 A1 | 3/2015 | Sadek |
| 2015/0094057 A1 | 4/2015 | Lu et al. |
| 2015/0105067 A1 | 4/2015 | Valliappan et al. |
| 2015/0118968 A1 | 4/2015 | Nory et al. |
| 2015/0126196 A1* | 5/2015 | Lu .............. H04W 76/048 455/437 |
| 2015/0146585 A1 | 5/2015 | Rashid et al. |
| 2015/0146645 A1 | 5/2015 | Sergeyev et al. |
| 2015/0156764 A1 | 6/2015 | Yang et al. |
| 2015/0163705 A1* | 6/2015 | Lu .............. H04W 76/043 370/331 |
| 2015/0172870 A1 | 6/2015 | Venkatesan et al. |
| 2015/0195831 A1 | 7/2015 | Du et al. |
| 2015/0208225 A1 | 7/2015 | Yu et al. |
| 2015/0223084 A1 | 8/2015 | Lightstone et al. |
| 2015/0230284 A1 | 8/2015 | Nimbalker et al. |
| 2015/0257094 A1 | 9/2015 | Wei et al. |
| 2015/0264677 A1 | 9/2015 | He et al. |
| 2015/0271763 A1 | 9/2015 | Balachandran et al. |
| 2015/0319731 A1 | 11/2015 | Cui et al. |
| 2015/0319745 A1 | 11/2015 | Seo et al. |
| 2015/0326356 A1 | 11/2015 | Guan et al. |
| 2015/0327201 A1 | 11/2015 | He et al. |
| 2015/0334635 A1 | 11/2015 | Caretti et al. |
| 2015/0334693 A1* | 11/2015 | Lu .............. H04W 72/04 370/329 |
| 2015/0341911 A1 | 11/2015 | Wakabayashi et al. |
| 2015/0341914 A1 | 11/2015 | Lee et al. |
| 2015/0341918 A1 | 11/2015 | Yang et al. |
| 2015/0351059 A1 | 12/2015 | Seo |
| 2016/0014589 A1 | 1/2016 | Niu et al. |
| 2016/0135200 A1 | 5/2016 | Brahmi et al. |
| 2016/0143077 A1 | 5/2016 | Fodor et al. |
| 2016/0150391 A1 | 5/2016 | Lee et al. |
| 2016/0234670 A1 | 8/2016 | Zhang et al. |
| 2016/0249283 A1 | 8/2016 | Yu et al. |
| 2016/0249344 A1 | 8/2016 | Schlienz et al. |
| 2016/0269185 A1 | 9/2016 | Stojanovski et al. |
| 2016/0302251 A1 | 10/2016 | Chatterjee et al. |
| 2016/0337835 A1 | 11/2016 | Xiong et al. |
| 2017/0006632 A1 | 1/2017 | Elliott et al. |

FOREIGN PATENT DOCUMENTS

| | | |
|---|---|---|
| CN | 102014441 A | 4/2011 |
| CN | 102754518 A | 10/2012 |
| CN | 102859925 A | 1/2013 |
| CN | 103229585 A | 7/2013 |
| CN | 105359059 A | 2/2016 |
| CN | 105359476 A | 2/2016 |
| CN | 105359606 A | 2/2016 |
| CN | 105359615 A | 2/2016 |
| CN | 105379316 A | 3/2016 |
| CN | 105659660 A | 6/2016 |
| CN | 106060769 A | 10/2016 |
| CN | 106912109 A | 6/2017 |
| EP | 2509345 A1 | 10/2012 |
| EP | 2579672 A1 | 4/2013 |
| HK | 1221109 A1 | 5/2017 |
| HK | 1221110 A1 | 5/2017 |
| HK | 1221525 A1 | 6/2017 |
| HK | 1221564 A1 | 6/2017 |
| HK | 1222282 A | 6/2017 |
| JP | 2012507974 A | 3/2012 |
| JP | 2012507975 A | 3/2012 |
| JP | 2012191353 A | 10/2012 |
| JP | 2013529416 A | 7/2013 |
| JP | 2014504814 A | 2/2014 |
| JP | 2014530521 A | 11/2014 |
| JP | 2014533448 A | 12/2014 |
| JP | 2016509799 A | 3/2016 |
| JP | 2016527848 A | 9/2016 |
| JP | 6130069 B2 | 4/2017 |
| KR | 1020090106603 A | 10/2009 |
| KR | 1020110068768 A | 6/2011 |
| KR | 1020120039605 A | 4/2012 |
| KR | 1020120137496 A | 12/2012 |
| KR | 1020130006673 A | 1/2013 |
| KR | 1020130035964 A | 4/2013 |
| KR | 1020160021188 A | 2/2016 |
| KR | 101741590 B1 | 5/2017 |
| TW | 201246859 A | 11/2012 |
| TW | 201521505 A | 6/2015 |
| TW | I552641 B | 10/2016 |
| TW | 201705810 A | 2/2017 |
| WO | WO-2011099821 A2 | 8/2011 |
| WO | WO-2011100596 A2 | 8/2011 |
| WO | WO-2011112051 A2 | 9/2011 |
| WO | WO-2011119680 A2 | 9/2011 |
| WO | WO-2012088470 A1 | 6/2012 |
| WO | WO-2012136311 A1 | 10/2012 |
| WO | WO-2012177002 A2 | 12/2012 |
| WO | WO-2013012759 A1 | 1/2013 |
| WO | WO-2013013409 A1 | 1/2013 |
| WO | WO-2013025057 A2 | 2/2013 |
| WO | WO-2013036823 A1 | 3/2013 |
| WO | WO-2013040231 A1 | 3/2013 |
| WO | WO-2013048193 A1 | 4/2013 |
| WO | WO-2013087835 A1 | 6/2013 |
| WO | WO-2014113537 A1 | 7/2014 |
| WO | WO-2015021267 A1 | 2/2015 |
| WO | WO-2015021276 A1 | 2/2015 |
| WO | WO-2015021284 A1 | 2/2015 |
| WO | WO-2015021315 A1 | 2/2015 |
| WO | WO-2015021317 A1 | 2/2015 |
| WO | WO-2015080796 A1 | 6/2015 |

OTHER PUBLICATIONS

"U.S. Appl. No. 14/280,799, Response filed Aug. 27, 2015 to Non Final Office Action dated Jul. 13, 2015", 11 pgs.

"U.S. Appl. No. 14/300,937, Non Final Office Action dated Sep. 25, 2015", 12 pgs.

"U.S. Appl. No. 14/318,008, Non Final Office Action dated Oct. 8, 2015", 16 pgs.

"U.S. Appl. No. 14/318,085, Non Final Office Action dated Oct. 8, 2015", 14 pgs.

"Discussion of D2D discovery methods", R1-132068, 3GPP TSG RAN WG1 Meeting #73, (May 2013), 1-5.

"Discussion on design options for D2D discovery", R1-131924, 3GPP TSG RAN WG1 Meeting #73, (May 2013), 1-6.

"International Application Serial No. PCT/US2014/050128, International Search Report dated Nov. 13, 2014", 8 pgs.

"International Application Serial No. PCT/US2014/050128, Invitation to Correct Defects dated Aug. 14, 2014", 4 pgs.

"International Application Serial No. PCT/US2014/050128, Written Opinion dated Nov. 13, 2014", 7 pgs.

"International Application Serial No. PCT/US2014/050147, International Search Report dated Nov. 13, 2014", 3 pgs.

"International Application Serial No. PCT/US2014/050147, Written Opinion dated Nov. 13, 2014", 6 pgs.

"International Application Serial No. PCT/US2014/050159, International Search Report dated Nov. 18, 2014", 3 pgs.

"International Application Serial No. PCT/US2014/050159, Written Opinion dated Nov. 18, 2014", 7 pgs.

"International Application Serial No. PCT/US2014/050207, International Search Report dated Nov. 19, 2014", 3 pgs.

"International Application Serial No. PCT/US2014/050207, Written Opinion dated Nov. 19, 2014", 6 pgs.

"International Application Serial No. PCT/US2014/050209, International Search Report dated Nov. 27, 2014", 3 pgs.

"International Application Serial No. PCT/US2014/050209, Written Opinion mailed Nov. 27, 2014", 8 pgs.

(56) References Cited

OTHER PUBLICATIONS

"International Application Serial No. PCT/US2014/057619, International Search Report dated Dec. 26, 2014", 3 pgs.
"International Application Serial No. PCT/US2014/057619, Written Opinion dated Dec. 26, 2014", 6 pgs.
"ProSe direct communication (D2D)", R1-132174, 3GPP TSG-RAN WG1 Meeting #73, Renesas Mobile Europe Ltd, (May 2013), 1-4.
"Taiwanese Application Serial No. 103125302, Office Action mailed Sep. 23, 2015", W/ English Translation, 7 pgs.
"Techniques for D2D Discovery", R1-132503, 3GPP TSG RAN WG1 Meeting #73, (May 2013), 1-7.
Alcatel-Lucent, et al., "PRACH coverage extension for MTC devices", R1-130939, 3GPP TSG-RAN WG1 Meeting #72bis, Chicago, USA, [Online]. Retrieved from the Internet: <URL: http://www.3gpp.org/ftp/tsg_ran/wg1_rl1/TSGRL_72b/Docs/>, (Apr. 15-19, 2013), 3 pgs.
Ericsson, et al., "D2D for LTE Proximity Services: Overview", 3GPP TSG-RAN WG1 #73, R1-132028, (May 2013), 6 pgs.
U.S. Appl. No. 14/318,008, filed Jun. 27, 2014, Signaling Radio Bearer Optimizations and Other Techniques for Supporting Small Data Transmissions.
U.S. Appl. No. 14/318,085, filed Jun. 27, 2014, Power Saving Mode Optimizations and Related Procedures.
U.S. Appl. No. 14/300,937, filed Jun. 10, 2014, Coverage Extension Level for Coverage Limited Device.
U.S. Appl. No. 14/280,799, filed May 19, 2014, User Equipment and Method for Packet Based Device-to-Device (D2D) Discovery in an LTE Network.
"U.S. Appl. No. 14/280,799, Notice of Allowance dated Dec. 24, 2015", 8 pgs.
"U.S. Appl. No. 14/300,937, Final Office Action dated Mar. 25, 2016", 11 pgs.
"U.S. Appl. No. 14/300,937, Response filed Dec. 22, 2015 to Non Final Office Action dated Sep. 25, 2015", 13 pgs.
"U.S. Appl. No. 14/318,008, Final Office Action dated Apr. 25, 2016", 16 pgs.
"U.S. Appl. No. 14/318,008, Response filed Feb. 8, 2016 to Non Final Office Action dated Oct. 8, 2015", 13 pgs.
"U.S. Appl. No. 14/318,085, Response filed Mar. 7, 2016 to Non Final Office Action dated Oct. 8, 2015", 13 pgs.
"U.S. Appl. No. 14/473,008, Non Final Office Action dated Nov. 23, 2015", 28 pgs.
"U.S. Appl. No. 14/473,008, Preliminary Amendment filed Oct. 28, 2014", 17 pgs.
"U.S. Appl. No. 14/473,008, Response filed Feb. 23, 2016 to Non Final Office Action dated Nov. 23, 2015", 11 pgs.
"U.S. Appl. No. 15/022,534, Preliminary Amendment filed on Mar. 16, 2016", 8 pgs.
"International Application Serial No. PCT/US2014/050128, International Preliminary Report on Patentability dated Feb. 18, 2016", 9 pgs.
"International Application Serial No. PCT/US2014/050147, International Preliminary Report on Patentability mailed Feb. 18, 2016", 8 pgs.
"International Application Serial No. PCT/US2014/050159, International Preliminary Report on Patentability dated Feb. 18, 2016", 9 pgs.
"International Application Serial No. PCT/US2014/050207, International Preliminary Report on Patentability dated Feb. 18, 2016", 8 pgs.
"International Application Serial No. T/US2014/050209, International Preliminary Report on Patentability dated Feb. 19, 2016", 10 pgs.
"Taiwanese Application Serial No. 103125302, Response filed Dec. 17, 2015 to Office Action dated Sep. 23, 2015", w/ English Claims, 20 pgs.
"U.S. Appl. No. 14/318,006, Response filed Aug. 25, 2016 to Final Office Action dated Apr. 25, 2016", 12 pgs.
"U.S. Appl. No. 14/318,008, Notice of Allowance dated Sep. 16, 2016", 13 pgs.
"U.S. Appl. No. 14/318,085, Notice of Allowability dated Nov. 25, 2016", 2 pgs.
"U.S. Appl. No. 14/318,085, Notice of Allowance dated Sep. 23, 2016", 12 pgs.
"U.S. Appl. No. 14/318,085, Response filed Aug. 25, 2016 to Final Office Action dated May 25, 2016", 11 pgs.
"U.S. Appl. No. 14/473,008, Advisory Action dated Sep. 15, 2016", 5 pgs.
"U.S. Appl. No. 14/473,008, Examiner Interview Summary dated Sep. 16, 2016", 3 pgs.
"U.S. Appl. No. 14/473,008, Response filed Aug. 2, 2016 to Final Office Action dated Jun. 3, 2016", 13 pgs.
"U.S. Appl. No. 14/473,008, Response filed Oct. 3, 2016 to Advisory Action dated Sep. 15, 2016", 15 pgs.
"U.S. Appl. No. 14/496,952, Examiner Interview Summary dated Aug. 23, 2016", 3 pgs.
"U.S. Appl. No. 14/496,952, Final Office Action dated Nov. 17, 2016", 14 pgs.
"U.S. Appl. No. 14/496,952, Response filed Aug. 29, 2016 to Non Final Office Action dated Jun. 6, 2016", 8 pgs.
"U.S. Appl. No. 15/096,504, Preliminary Amendment filed Aug. 5, 2016", 7 pgs.
"Korean Application Serial No. 10-2016-7000316, Office Action dated Sep. 6, 2016", W/ English Translation, 9 pgs.
"Korean Application Serial No. 10-2016-7000316, Response filed Nov. 4, 2016 to Office Action dated Sep. 6, 2016", W/ English Translation of Claims, 27 pgs.
"Korean Application Serial No. 2016-7000399, Office Action dated Oct. 20, 2016", W/ English Translation, 9 pgs.
"U.S. Appl. No. 14/300,937, Notice of Allowance dated Jul. 15, 2016", 10 pgs.
"U.S. Appl. No. 14/318,085, Final Office Action dated May 25, 2016", 15 pgs.
"U.S. Appl. No. 14/473,008, Final Office Action dated Jun. 3, 2016", 31 pgs.
"U.S. Appl. No. 14/496,952, Non Final Office Action dated Jun. 6, 2016", 13 pgs.
"Chinese Application Serial No. 201480038461.6, Voluntary Amendment filed Jun. 17, 2016", w/ English Translation of Request form, 52 pgs.
"International Application Serial No. PCT/US2014/057619, International Preliminary Report on Patentability dated Jun. 9, 2016", 8 pgs.
"U.S. Appl. No. 14/318,008, Notice of Allowance dated Jan. 27, 2017", 5 pgs.
"U.S. Appl. No. 14/318,085, Notice of Allawability dated Jan. 4, 2017", 2 pgs.
"U.S. Appl. No. 14/473,008, Non Final Office Action dated Dec. 23, 2016", 35 pgs.
"U.S. Appl. No. 14/473,008, Response filed Mar. 3, 2017 to Non Final Office Action dated Dec. 23, 2016", 17 pgs.
"U.S. Appl. No. 14/496,952, Advisory Action dated Mar. 2, 2017", 3 pgs.
"U.S. Appl. No. 14/496,952, Response filed Feb. 17, 2017 to Final Office Action dated Nov. 17, 2016", 9 pgs.
"U.S. Appl. No. 15/186,779, Non Final Office Action dated Mar. 10, 2017", 20 pgs.
"U.S. Appl. No. 15/357,032, Non Final Office Action dated Mar. 14, 2017", 15 pgs.
"U.S. Appl. No. 15/357,032, Preliminary Amendment filed Dec. 29, 2016", 8 pgs.
"Considerations for power saving state", Alcatel-Lucent Shanghai Bell, Alcatel-Lucent, 3GPP TSG-SA WG2#98 62-133036, [Online] Retrieved from the Internet : <URL:http://www.3gpp.org/ftp/tsg_sa/WG2_Arch/TSGS2_98_Valencia/Docs/S2-133036.zip>, (Jul. 19, 2013).
"D2D discovery", R1-132317 D2D Discovery, 3rd Generation Partnership Project (3GPP), Retrieved from the Internet: <URL:http://www.3gpp.org/ftp/tsg_ran/WGI_RL1/TSGRI_73/Docs>, (May 11, 2013), 5 pgs.

(56) References Cited

OTHER PUBLICATIONS

"D2D Discovery Design for Public Safety and General Scenarios[online]", Intel Corporation,3GPP TSG-RAN WG1 ?74 R1-132941, [Online] Retrieved from the Internet : <URL:http://www.3gpp.org/ftp/tsg_ran/WG1_RL1/TSGR1_74/Docs/R1-132941.zip>, (Aug. 10, 2013), 7 pgs.

"D2D Discovery Terminology Way Forward", Qualcomm Inc., Huawei, HiSilicon, LG Electronics, LG Uplus, Intel, Samsung, NEC, RIM, ETRI. 3GPP TSG RAN WG1 #73 R1-132772, [Online] Retrieved from the Internet :<URL:http://www.3gpp.org/ftp/tsg_ran/WG1_RL1/TSGR1_73/Docs/R1-132772.zip>, (May 28, 2013), 4 pgs.

"Direct Discovery for LTE Based D2D [online]", Ericsson, ST-Ericsson, 3GPP TSG-RAN WG1#73 R1-132031, [Online] Retrieved from the Internet : <http://www.3gpp.org/ftp/tsg_ran/WG1_RL1/TSGR1_73/Docs/R1-132031.zip>, (May 11, 2013), 7 pgs.

"Discussion on MTC idle states for power saving", Alcatel-Lucent Shang Bell, Alcatel-lucent, 3GPP TSG-RAN WG2#82 R2-132031, [Online] Retrieved from the Internet : <URL: http://www.3gpp.org/ftp/tsg_ran/WG2_RL2/TSGR2_82/Docs/R2-132031.zip>, (May 11, 2013).

"Discussion on PRACH Coverage Enhancement fo r Low Cost MTC", Intel Corporation: 3GPP Draft; R1-132930—Discussion on PRACH Coverage Enhancement for Low Cost MTC, 3rd Generation Partnership Project (3GPP), Mobile Competence Centre ; 650, Route Deslucioles ; F-06921 Sophia-Antipo vol. RAN WG1, No. Barcelona, Spain, (Aug. 10, 2013).

"European Application Serial No. 14834152.2, Extended European Search Report dated Feb. 14, 2017", 7 pgs.

"European Application Serial No. 14834706.5, Extended European Search Report dated Feb. 2, 2017", 10 pgs.

"European Application Serial No. 14835021.8, Extended European Search Report dated Mar. 7, 2017", 13 pgs.

"European Application Serial No. 14835105.9, Extended European Search Report dated Feb. 23, 2017", 10 pgs.

"European Application Serial No. 16192991.4, Extended European Search Report dated Jan. 3, 2017", (Jan. 3, 2017), 10 pgs.

"Further evaluation and way forward of selected UEPCOP solutions", Intel Corporation,3GPP TSG-RAN WG2?83 R2-132794, <URL:http://www.3gpp.org/ftp/tsg_ran/WG2_RL2/TSGR2_83/Docs/R2-132794zip>, (Aug. 10, 2013).

"Japanese Application Serial No. 2016-525843, Office Action dated Dec. 20, 2016", (W/ English Translation), 15 pgs.

"Japanese Application Serial No. 2016-525844, Office Action dated Dec. 20, 2016", W/ English Translation, 8 pgs.

"Japanese Application Serial No. 2016-533442, Office Action dated Jan. 24, 2017", with English Translation, 9 pgs.

"Korean Application Serial No. 2016-7000399, Response filed Dec. 19, 2016 to Office Action dated Oct. 20, 2016", (English Translation of Claims), 32 pgs.

"ProSe UE discovery design aspects[online]", Renesas Mobile Europe Ltd,3GPP TSG-RAN WG1 Meeting #73 R1-132173, [Online] Retrieved from the Internet : <URL:http://www.3gpp.org/ftp/tsg_ran/WG1_RL1/TSGR1_73/Docs/R1-132173.zip>, (May 11, 2013), 4 pgs.

"Study on Enhancements to Machine-Type Communications (MTC) and other Mobile Data Applications", Technical Specification Group Radio Access Network; 3GPP TSG-RAN WG2#82 R2-132251, [Online] Retrieved from the Internet : <URL:http://www.3gpp.org/ftp/tsg_ran/WG2_RL2/TSGR2_82/Docs/R2-132251.zip>, (Jun. 2, 2013), 251.

"TR 23.887: Machine-Type and other Mobile Data Applications Communications Enhancements (Release 12) for information (MTCe)". SA WG2, 3GPP TSG-SA#60 SP-130234, [Online] Retrieved from the Internet : <URL:http://www.3gpp.org/ftp/tsg_sa/TSG_SA/TSGS_60/Docs/SP-130234.zip>, (Jun. 11, 2013), 93-115.

"Evolved Universal Terrestrial Radio Access (E-UTRA) and Evolved Universal Terrestrial Access Network (E-UTRAN)", 3GPP TS 36.300 v11.6.0 Technical Specification Group Radio Access Network. Release 11, (Jun. 2013), 209 pgs.

"Evolved Universal Terrestrial Radio Access (E-UTRA); Physical Channels and Modulation", 3GPP TS 36.211 v11.0.0 Technical Specification Group Radio Access Network, Release 11, (Sep. 2012), 106 pgs.

"Evolved Universal Terrestrial Radio Access (E-UTRA); Physical layer procedures", 3GPP TS 36.213 v11.0.0 Technical Specification Group Radio Access Network, Release 11, (Sep. 2012), 143 pgs.

"Evolved Universal Terrestrial Radio Access (E-UTRA); Radio Resource Control (RRC)", 3GPP TS 36.331 V11.4.0 (Jun. 2013) Technical Specification Group Radio Access Network; Protocol specification (Release 11), (Jun. 2013), 346 pgs.

"Evolved Universal Terrestrial Radio Access (E-UTRA); User Equipment (UE) radio access capabilities", 3GPP TS 36.306 v11.3.0 Technical Specification Group Radio Access Network, Release 11, (Mar. 2013), 27 pgs.

"Evolved Universal Terrestrial Radio Access (E-UTRS) User Equipment (UE) procedures in idle mode", 3GPP TS 36.304 v11.4.0 Technical Specification Group Radio Access Network, Release 11, (Jun. 2013), 34 pgs.

"Evolved Universal Terrestrial Radio Access (E_UTRA); Multiplexing and channel coding", 3GPP TS 36.212 v11.0.0, Technical Specification Group Radio Access Network, Release 11, (Sep. 2012), 79 pgs.

"Evolved Universal Terrestrial Radio Access Network (E-UTRAN); S1 Application Protocol (S1AP)", 3GPP TS 36.413 v11.4.0 Technical Specification Group Radio Access Network, Release 11, (Jun. 2013), 274 pgs.

"General Packet Radio Service (GPRS) enhancements for Evolved Universal Terrestrial Radio Access Network (E-UTRAN) access", 3GPP TS 23.401 V12.1.0. Technical Specification Group Services and System Aspects. Release 12., (Jun. 2013), 291 pgs.

"Machine-Type and other Mobil Data Applications Communications Enhancements", 3GPP SA WG2 Meeting #92, TD S2-123002; 3GPP TR 23.887 v0.1.0, Release 12, (May 2012), 16 pgs.

"Machine-Type and other Mobile Data Applications Communications Enhancemetns", 3GPP TR 23.887 v1.1.0 Technical Specification Group Services and System Aspects (Release 12), (Sep. 2013), 153 pgs.

"Mobile radio interface Layer 3 specification; Core network protocols; Stage 3", 3GPP TS 24.008 V12.2.0. Technical Specification Group Core Network and Terminals. Release 12., (Jun. 2013), 682 pgs.

"Non-Access-Stratum (NAS) protocol for Evolved Packet System (EPS); Stage 3", 3GPP TS 24.301 V12.1.0. Technical Specification Group Core Network and Terminals. Release 12., (Jun. 2013), 350 pgs.

"Study on LTE Device to Device Proximity Services", 3GPP TSG RAN Meeting#58, RP-122009, Qualcomm Incorporated, [Online]. Retrieved from the Internet: <URL: http://www.3gpp.org/ftp/tsg_ran/TSG_RAN/TSGR_58/Docs/RP-122009.zip>, (2012), 6 pgs.

"Study on provision of low-Cost MTC UEs based on LTE", 3GPP TR 36.888 v2.1.1 Technical Specification Group Radio Access Network, Release 12, (Jun. 2013), 55 pgs.

Andreev, S., et al., "Efficient small data access for machine-type communications in LTE", 2013 IEEE International Conference on Communications (ICC), (2013), 3569-3574.

"European Application Serial No. 14834152.2, Response Filed Jul. 4, 2017 to Extended European Search Report dated Feb. 14, 2017", 18 pgs.

"Japanese Application Serial No. 2016-525843, Response Filed Mar. 17, 2017 to Office Action dated Dec. 20, 2016", (W/ English Claims), 18 pgs.

"Japanese Application Serial No. 2016-525844, Response Filed Mar. 15, 2017 to Office Action dated Dec. 20, 2016", (W/ English Claims), 8 pgs.

"Japanese Application Serial No. 2016-533442, Response Filed Apr. 24, 2017 to Office Action dated Jan. 24, 2017", (W/ English Cairns), 22 pgs.

(56) References Cited

OTHER PUBLICATIONS

"3rd Generation Partnership Project; Technical Specification Group Services and System Aspects; Machine-Type and other Mobile Data Applications Communications Enhancements (Release 12)", 3GPP TR 23.887 V0.8.0, 3rd Generation Partnership Project (3GPP), Mobile Competence Centre; 650, Route Des Lucioles; F-06921 Sophia-Antipolis Cedex; France, (Aug. 2, 2013), 1-153.

"Chinese Application Serial No. 201480038449.5, Office Action dated May 16, 2017", W/English Claims, 16 pgs.

"European Application Serial No. 14833927.8, Extended European Search Report dated May 10, 2017", 11 pgs.

"European Application Serial No. 14866388.3, Extended European Search Report dated Jul. 6, 2017", 10 pgs.

"European Application Serial No. 17165440.3, Extended European Search Report dated May 15, 2017", 10 pgs.

"Korean Application Serial No. 10-2017-7013997, Voluntary Amendment Filed on Jun. 15, 2017", (W/ English Claims), 12 pgs.

"Korean Application Serial No. 2016-7000580, Office Action dated May 1, 2017", With English Translation, 10 pgs.

"Korean Application Serial No, 2016-7000580, Response Filed Jun. 30, 2017 to Office Action dated May 1, 2017", (W/ English Claims), 38 pgs.

"Korean Application Serial No. 2016-7020017, Office Action dated May 1, 2017", With English Translation, 10 pgs.

"Korean Application Serial No. 2016-7020017, Response Filed Jun. 29, 2017 to Office Action dated May 1, 2017", (W/ English Claims), 24 pgs.

"LTE D2D Reference System Design and Evaluation Methodology", 3GPP TSG RAN WG1 Meeting #72bis, R1-130953, 3GPP ftp server, (Apr. 6, 2013), 8 pgs.

"Taiwanese Application Serial No. 105121010, Office Action dated May 24, 2017", W/ English Translation, 16 pgs.

Huawei, et al., "Power Saving State for Devices", 3GPP Draft; S2-124184, 3RD Generation Partnership Project (3GPP), Mobile Competence Centre ; Route Deslucioles; F-06921 Sophia-Antipolis Cedex; France vol. SA WG2, [Online] Retrieved from the Internet: <http://www.3gpp.org/ftpitsg sa/WG2Areh/TSGS2_93_Sofia/Docs/>, (Oct. 12, 2012).

* cited by examiner

US 9,788,186 B2

SIGNALING FOR PROXIMITY SERVICES AND D2D DISCOVERY IN AN LTE NETWORK

PRIORITY CLAIMS

This application claims the benefit of priority under 35 USC 119(e) to U.S. Provisional Patent Application Ser. No. 61/863,902, filed Aug. 8, 2013, and U.S. Provisional Patent Application Ser. No. 61/909,938, filed Nov. 27, 2013, each of which is incorporated herein by reference in its entirety.

TECHNICAL FIELD

Embodiments pertain to wireless communications. Some embodiments relate to 3GPP LTE (Long Term Evolution) networks. Some embodiments relate to direct device-to-device (D2D) communication. Some embodiments relate to device discovery in LTE networks.

BACKGROUND

Proximity-based applications and services represent a fast growing social and technological trend that may have a major impact on evolution of cellular wireless/mobile broadband technologies. These services are based on the awareness of two devices or two users being close to each other and may include such applications as public safety operations, social networking, mobile commerce, advertisement, gaming, etc. Device to device (D2D) discovery is the first step to enable D2D service. With direct D2D communication, user equipment (UE) may communicate directly with each other without involvement of a base station or an enhanced node B (eNB). One issue with D2D communication is device discovery to enable D2D service. Device discovery involves discovering one or more other discoverable UEs within communication range for D2D communication. Device discovery also involves being discovered by one or more other discovering UEs within communication range for D2D communication. There are many unresolved issues with respect to device discovery for D2D communication including resource allocation and signaling, particularly for Proximity Service (ProSe) D2D discovery.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments disclosed herein provide signaling designs for the support of LTE Proximity Services (ProSe) D2D discovery. In these embodiments, UEs may be ProSe-enabled UEs configured for D2D discovery signal transmission and D2D communication. Some embodiments provide configuration of D2D discovery zones with partitioning of D2D Discovery Zones into contention-based and non-contention-based Discovery Zones for both network-common and cell-specific configurations of discovery zones. Some embodiments provide mechanisms for UE feedback to provide an eNB with information about the loading of discovery zones. Some embodiments provide options for support of inter-cell/eNB discovery. Some embodiments provide for the use and configuration of silencing factors for random silencing/adaptive random silencing for transmission of D2D discovery packets. Some embodiments provide for signaling contents that include: the discovery zone configuration, a silencing factor, a transmit power control configuration, hopping related parameters, and a scrambling identity for scrambling of cyclic-redundancy check (CRC) mask of discovery packets. Some embodiments provide signaling mechanisms for the above-mentioned signaling contents. Some embodiments provide for static provisioning and/or pre-configuration of D2D discovery resources. Some embodiments provide for network and UE behavior to support contention-free direct device discovery. These embodiments are discussed in more detail below.

Figure 1:
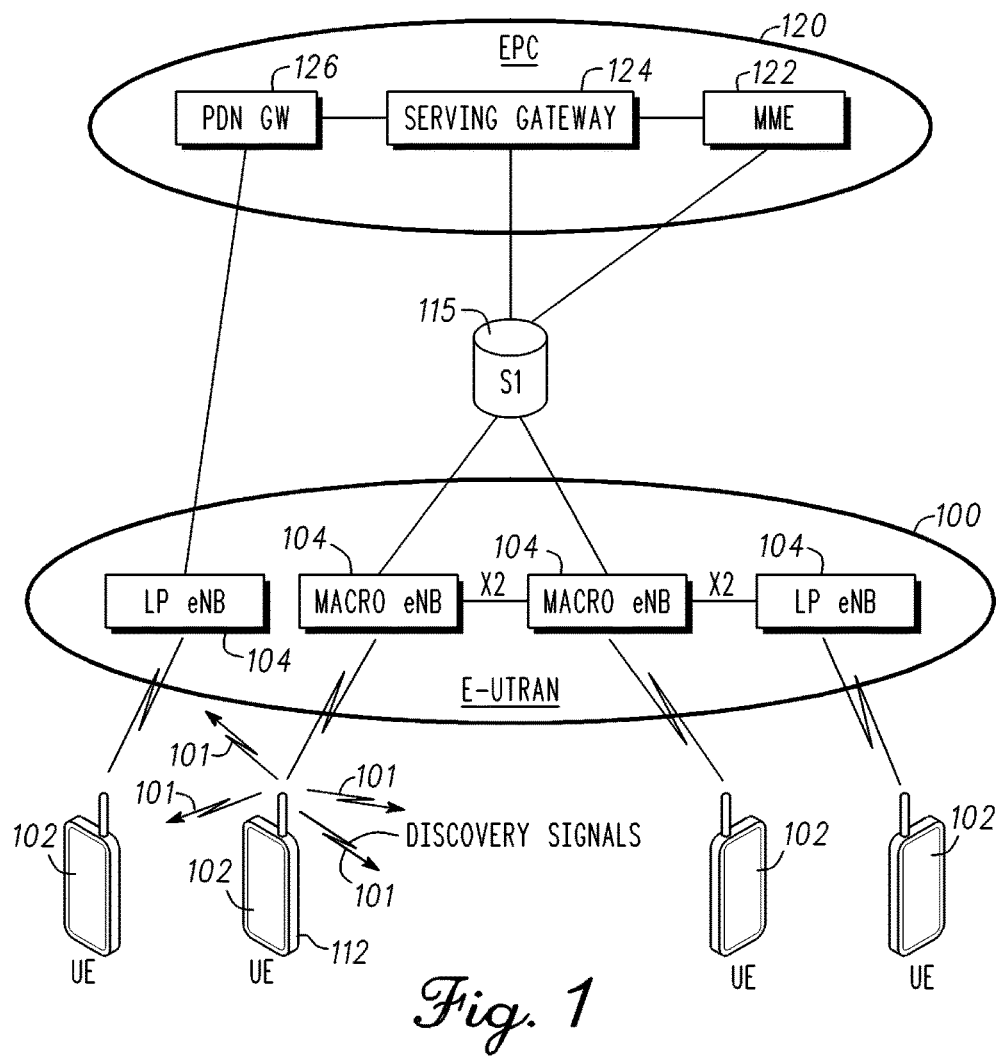
FIG. 1 shows a portion of an end-to-end network architecture of an LTE network in accordance with some embodiments.

FIG. 1 shows a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102. The eNBs 104 may include macro eNBs and low power (LP) eNBs. UEs 102 may be ProSe-enabled.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN may be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some LTE embodiments, a physical downlink shared channel (PDSCH) carries user data and higher-layer signaling to a UE 102. The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs within a cell) is performed at the eNB 104 based on channel quality information fed back from the UEs 102 to the eNB 104, and then the downlink resource assignment information is sent to a UE on a physical downlink control channel (PDCCH) used for (and possibly assigned to) the UE 102.

The PDCCH uses CCEs (control channel elements) to convey the control information. Before being mapped to resource elements, the PDCCH complex-valued symbols may be first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH may be transmitted using one or more CCEs, depending on the size of DCI and the channel condition. There may be four or more different PDCCH formats defined in LTE with different numbers of CCEs (e.g., aggregation level, L=1, 2, 4, or 8).

In accordance with some embodiments, the UEs 102 that are ProSe-enabled may be arranged for device-to-device (D2D) communications including D2D discovery of other UEs 102 for direct D2D communication. In these embodiments, ProSe-enabled UEs 102 may transmit discovery signals 101 within discovery resources to discover one or more other ProSe-enabled UEs. These embodiments are discussed in more detail below.

Figure 2:
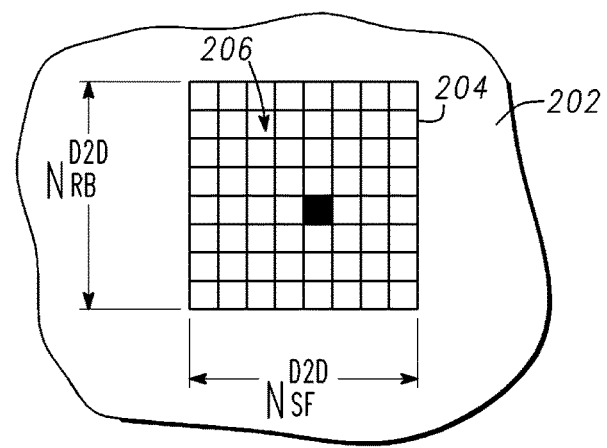
FIG. 2 shows a structure for a resource grid including a discovery zone for D2D communications in accordance with some embodiments.

FIG. 2 shows a structure for a resource grid including a discovery zone for D2D communications in accordance with some embodiments. The depicted grid is a time-frequency grid, called a resource grid, which is the physical resource in the downlink or uplink in each slot. The smallest time-frequency unit in a resource grid is denoted as a resource element (RE). The resource grid comprises a number of resource blocks (RBs) which describe the mapping of certain physical channels to resource elements. Each resource block comprises a collection of resource elements and in the frequency domain, represents the smallest quanta of resources that may be allocated, although the scope of the embodiments is not limited in this respect. There are several different physical channels that are conveyed using such resource blocks. The resource grid illustrated in FIG. 2 may comprise an LTE operation zone 202 which may comprise a plurality of physical RBs (PRBs) for use by the RAN 100.

In accordance with some embodiments, a UE 102 (FIG. 1) may receive signaling from an eNB 104 (FIG. 1) indicating a discovery zone 204 within the LTE operation zone 202. The discovery zone 204 may comprise a plurality of PRBs 206 of a discovery resource. The UE 102 may transmit a discovery signal or discovery packet 101 (FIG. 1) for receipt by one or more other UEs for D2D discovery within some PRBs 206 of the discovery zone 204. In some embodiments, the resources allocated for D2D discovery may be resources of a physical-uplink shared channel (PUSCH), although the scope of the embodiments is not limited in this respect.

A PRB may be associated with a particular slot of a subframe in the time dimension and a particular group of frequency subcarriers in the frequency dimension. Each PRB, for example, may be identified by a RB index and a subframe index. In some embodiments, a discovery packet 101 may be transmitted within M subframes of N resources blocks where M and N are at least one and may be greater than one. These embodiments are described in more detail below.

In some embodiments, a PRB may comprise twelve sub-carriers in the frequency domain by 0.5 ms (i.e., one slot) in the time domain. The PRBs may be allocated in pairs (in the time domain), although this is not a requirement. In some embodiments, a PRB may comprise a plurality of REs. A RE may comprise one sub-carrier by one symbol. When a normal CP is used, a RB contains seven symbols. When an extended CP is used, the RB contains six symbols. A delay spread that exceeds the normal CP length indicates the use of extended CP. Each subframe may be one millisecond (ms) and one frame may comprise ten such subframes.

There are two different approaches in D2D discovery: restricted/closed D2D discovery and open D2D discovery. Restricted/closed D2D discovery applies to use cases wherein a discoverable device may be discovered only by a select set of ProSe-enabled discovering devices. A further implication of closed device discovery is consideration of scenarios wherein a discovering device tries to discover particular ProSe-enabled device(s) (one or many from a set of ProSe-enabled devices). Thus, for this use case, a discovering device would be assumed to know the ProSe-enabled device it wishes to discover in its proximity.

Contrary to closed D2D discovery, open device discovery considers use cases wherein a discoverable device may want itself to be discovered by other ProSe-enabled devices in its proximity. From the perspective of the discovering device, open device discovery implies that a discovering device may not be assumed to be aware of the identity of other ProSe-enabled devices prior to discovery. Consequently, the device discovery mechanism for open discovery should aim towards discovering as many ProSe-enabled devices in its proximity as possible.

For open D2D discovery, an eNB 104 has limited control on the discovery process among UEs 102. In particular, an eNB 104 may periodically allocate certain discovery resources in the form of D2D discovery regions for a UE 102 to transmit the discovery information. The discovery information may be in the form of discovery sequence or discovery packet with payload information. The discovery related information content that UEs intend to share with each other may be higher as the design would need to transmit the unique ID for device identification, service identity, etc. (e.g., 48 bits or more) as data payload, protected by CRC. The number of resource blocks (RB) required for discovery packet transmission in open D2D discovery design, which is denoted as $L_{RB}^{D2D}$, may be 1 or more, depending on the payload size and the overall discovery performance requirement.

In some embodiments, a discovery region may comprise a number of occurrences of periodic discovery zones, with each discovery zone comprising of some RBs in frequency domain and several subframes in time domain. FIG. 2 shows an example of a discovery zone 204 within LTE operation zone 202 in which, $N_{RB}^{D2D}$, $n_{RB}^{start}$, $N_{SF}^{D2D}$ and $n_{SF}^{start}$ are denoted as the number of allocated RBs, the starting RB index and the number of subframes, the starting subframe index of each discovery zone, respectively. The information regarding the partitioning of these D2D discovery regions may be semi-statically signaled by the eNB using RRC signaling or by System Information Blocks (SIBs) for within network coverage scenarios. For the partial network coverage scenario, such information may be forwarded by the coordinator UE to the UEs that are outside network coverage. For out of network coverage scenario, the discovery zone may be predefined or broadcasted by the centralized D2D device.

In some embodiments, the $N_{RB}^{D2D}$ and $n_{RB}^{start}$ parameters are not included in the D2D zone configuration message, and instead, the full system bandwidth, except the PUCCH region (at band edges), may be designed to be exclusively reserved for D2D discovery from system perspective, although the scope of the embodiments is not limited in this respect. In some embodiments, the parameter $n_{SF}^{start}$ may be configured as a periodicity for D2D discovery zone allocation.

Even for the case of UE-based open discovery, it would be beneficial to exploit potential network assistance in UE-specific discovery resource allocation for transmission of discovery signals for the UEs in RRC_CONNECTED mode, and thereby improve the efficiency of the discovery process. In this regard, each D2D Discovery Region (D2D-DZ) may be further divided into two orthogonal time-frequency zones: (1) Non-contention-based D2D DZ (NCB-D2D DZ) for which the eNB allocates periodic resources for transmission of discovery signals and this region is accessible to D2D UEs in RRC_CONNECTED mode; (2) Contention-based D2D DZ (CB-D2D DZ): This region is, in general, available to all D2D UEs (including out of coverage UEs) wherein D2D-enabled UEs follow a purely contention-based transmission of discovery signals. Moreover, the D2D discovery resources used for CB-D2D DZ might be further divided into two parts, called Part A and Part B to enable D2D discovery and to roughly indicate the required size of D2D communication resources (e.g., the number of subframes for D2D communication) depending of the amount of D2D data buffered at UE side, especially due to the fact that D2D discovery procedure may be followed by a D2D communication operation. The use of a D2D discovery resource from one group indicates preference for the larger amount of resources then one predefined threshold.

In accordance with some embodiments, a D2D discovery zone may be configured in two distinct ways: network-common D2D discovery zone and cell-specific D2D discovery zone, the details of which are described below. For network-common discovery zones, a common set of time-frequency resources may be reserved for D2D discovery across the entire network. The configuration could be different between different Public Land Mobile Networks (PLMNs) to enable the respective operators a certain degree of flexibility in resource provisioning. The discovery zone may be provisioned by each PLMN via the Operations, Administration, and Maintenance (OAM) tools. Network-common configuration of discovery zones may be signaled via multiple ways. The exact resource provisioning may be determined based on the statistics of the number of ProSe-enabled UEs in the network, their respective capabilities and location (up to the tracking area (TA) granularity). This information is available at the D2D server and the D2D server can inform the eNBs of the exact resource configuration via the Mobility Management Entity (MME).

For cell-specific discovery zones, each eNB 104 may determine the exact resource configuration for the cell-specific discovery zones using information on the current number of active ProSe-enabled UEs 102 and the interference situation. Some of this information may be obtained via periodic/event-triggered/on-demand feedback from the ProSe-enabled UEs 102 participating in the discovery process. To enable inter-eNB D2D discovery, a certain level of coordination between neighboring eNBs exists and may be achieved via exchange of information on the configuration of discovery zones between neighboring eNBs over an X2 interface.

In accordance with embodiments, an eNB 104 may transmit signaling to indicate D2D discovery zone configuration to ProSe-enabled UEs 102. The signaling may indicate time and frequency resources and a periodicity of the discovery zone 204 and may indicate operational parameters for the discovery zone 204. The resources of the D2D discovery zone 204 may be allocated for D2D discovery signal transmission by the ProSe-enabled UEs 102.

In some embodiments, the D2D discovery zone configuration signaling may indicate one or more occurrences of the discovery zone 204 and is sent by the eNB 104 either semi-statically using radio-resource control (RRC) signaling or sent using SIBs. In the example illustrated in FIG. 2, the discovery zone 204 comprises a plurality of PRBs 206 within an LTE operation zone 202 and the discovery zone 204 may occur periodically or regularly.

In some embodiments, the signaling is sent by the eNB either using dedicated RRC signaling or sent using common radio-resource control (RRC) signaling via SIBs (i.e., SIB signaling). When the signaling sent by the eNB uses common RRC signaling via SIBs, the signaling sent by the eNB may include at least one of a SIB transmission and a paging transmission. In some embodiments, the configuration information may either added to an existing SIB (e.g., in accordance with LTE Release 11) or is signaled via a newly defined SIB (e.g., in accordance with al later LTE release).

For signaling in the case of both network-common and cell-specific discovery zone allocation, the network should be able to signal this information to UEs in both RRC_CONNECTED and RRC_IDLE modes of operation. For network-common D2D discovery zone allocation, different signaling mechanisms may be applied. In some embodiments, existing system information block (SIBs) (e.g., SIB2) may be used to signal the D2D discovery zone configuration information including silencing factor and other related cell- or network-common parameters discussed in more detail below.

In some embodiments, the discovery zone 204 may be referred to or considered a discovery period. In some embodiments, contention-based D2D discovery may be referred or considered Type 1 discovery while non-contention based D2D discovery may be referred to or considered Type 2 discovery.

In some embodiments, the D2D discovery zone configuration signaling indicates at least one of a non-contention-based D2D discovery zone (NCB-D2D DZ) for which periodic resources are allocated for non-contention based transmission of discovery signals 101 by only ProSe-enabled UEs in RRC connected mode, and a contention-based D2D discovery zone (CB-D2D DZ) for which periodic resources are allocated for contention-based transmission of discovery signals 101 by any ProSe-enabled UEs including ProSe-enabled UEs in RRC connected mode, RRC idle mode and out of coverage UEs. In these embodiments, the non-contention-based D2D discovery zone may be designated for transmission of discovery signals 101 in accordance with a non-contention based technique by ProSe-enabled UEs in RRC connected mode. In some embodiments, ProSe-enabled UEs in RRC connected mode may be assigned specific discovery resources of the non-contention-based D2D discovery zone for their transmission of discover signals 101. In some embodiments, the D2D discovery zone configuration signaling may indicate that the discovery zone 204 is partitioned into a non-contention-based D2D discovery zone and a contention-based D2D discovery zone.

In some of these embodiments, the contention-based D2D discovery zone may be designated for transmission of discovery signals 101 in accordance with a purely contention based technique by any ProSe-enabled UE. In these embodiments, ProSe-enabled UEs are not assigned specific discovery resources of the contention-based transmission of discover signals 101. ProSe-enabled UEs that utilize the contention-based D2D discovery zone may include ProSe-enabled UEs in RRC connected mode, ProSe-enabled UEs in RRC idle mode, and other ProSe-enabled UEs such as out of coverage UEs (e.g., UEs connected to other eNBs).

In some of these embodiments, an eNB 104 may provide the signaling of D2D discovery resources and both contention-based and contention-free D2D discovery resources may be partitioned and configured by the eNB. In some embodiments, the partitioning may be logical. For the actual partitioning of resources, it would eventually be up to the network or the eNB, (i.e., based on implementation). In some embodiments, some of the physical resources overlap between the two zones/resource pools, although the scope of the embodiments is not limited in this respect.

In some embodiments, application layer signaling may be used to signal the D2D discovery zone configuration. In these embodiments, a D2D server may signal the D2D discovery zone configuration during D2D registration of the ProSe-enabled UEs. Changes to the D2D discovery zone configuration may be signaled to the ProSe-enabled UEs by application layer reconfiguration messages from the D2D server.

In some embodiments, non-access stratum (NAS) signaling may be used to signal the D2D discovery zone configuration. In these embodiments, a mobility management entity (MME) may signal the D2D discovery zone configuration during D2D registration of the ProSe-enabled UEs with a D2D server. In these embodiments, either the UE or the D2D server may request the discovery zone information. For both of the above signaling options (application layer or NAS signaling), it may be less efficient to support contention-free resource allocation to RRC_CONNECTED UEs because discovery zone resource is managed by the MME instead of the eNB and consequently, dynamic resource allocation is not preferred due to the signaling overhead in core network.

Figure 3A:
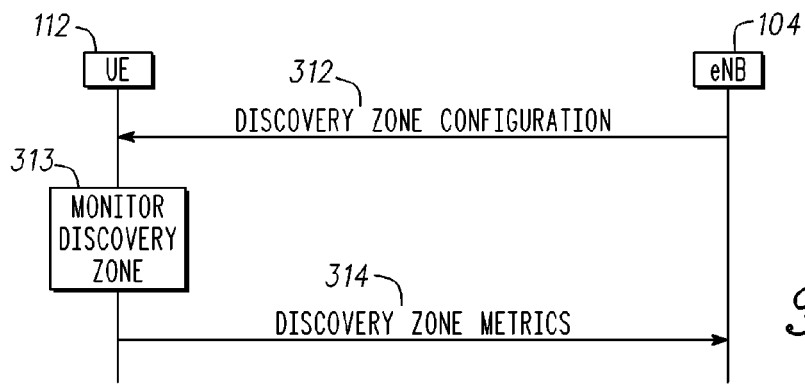
FIG. 3A illustrates the reporting of discovery zone metrics in accordance with some embodiments.

FIG. 3A illustrates the reporting of discovery zone metrics in accordance with some embodiments. In these embodiments, an eNB 104 (FIG. 1) may be configured to receive discovery zone loading metrics, the discovery zone loading metrics based on monitoring of discovery signals 101 (FIG. 1) within the discovery zone 204 (FIG. 2) by one or more ProSe-enabled UEs 102 (FIG. 1). The eNB 104 may determine whether or not to make changes to a resource allocation configuration for D2D activities based on the discovery zone loading metrics. In these embodiments, ProSe-enabled UEs 102 may monitor the discovery zone 204 for D2D discovery signals 101 transmitted by other ProSe-enabled UEs 102 and report discovery zone loading metrics to the eNB 104. Based on the discovery zone loading metrics, the eNB 104 may make changes to its resource allocation configuration for D2D activities including resources for D2D discovery and resources for D2D communications. In some embodiments, based on the discovery zone loading metrics, the eNB 104 may make changes to optimize the resource allocation configuration for D2D activities. For example, the eNB 104 may change the size of the resource pool for D2D activities and may allocate subsequent discover zone resources as well as allocate resources for subsequent D2D communication based on the discovery zone loading metrics. Based on the discovery zone loading metrics, the eNB 104 may also apply or suspend one or more interference control techniques, for example, by changing parameters for interference suppression (such as random silencing or random probabilistic transmission). As illustrated in FIG. 3A, a ProSe-enabled UE 102 may receive signaling 312 indicating a discovery zone configuration from an eNB 104. The UE 102 may monitor the discovery zone in operation 313 and may report discovery zone metrics in message 314.

In some embodiments, the discovery zone metrics include a count of discovery signal transmissions in a number of occurrences of the discovery zone (e.g., a count number). In some embodiments, the discovery zone metrics further include a number of unique discovery signal transmissions, and the eNB may determine a number of ProSe-enabled UEs 102 based on the discovery zone loading metrics. In some embodiments, the discovery zone metrics may include at least one of: a number of discovery signal transmissions in a number of occurrences of the discovery zone; a number of successfully detected discovery signals in a number of occurrences of the discovery zone; and an indication of the interference level in a number of occurrences of the discovery zone. In some of these embodiments, ProSe-enabled UEs may be able to distinguish the discovery signal transmissions of other UEs based on the DMRS, and the discovery zone metrics may include a number of blindly detected unique DMRS sequences or unique cyclic shift values.

In these embodiments, UEs may be configured to provide feedback for configuration of D2D discovery zones. For the case of cell-specific discovery zone configurations, the eNB may receive information on the loading in the cell from ProSe-enabled UEs participating in the discovery process. However, an eNB may only know about the number of such ProSe-enabled UEs in RRC_CONNECTED mode. The eNB may not be aware of the number of the RRC_IDLE mode UEs participating in D2D discovery within its serving area. Some embodiments provide the eNB with the information about the loading of the discovery zones are realized via enabling UE feedback.

In some embodiments, ProSe-enabled UEs may report the number of transmissions in the past N discovery zones, where N may be a pre-determined or configurable parameter, in the form of a paging response. Since the paging cycle may be configured in a UE-specific way with different groups of UEs assigned different subframes for monitoring paging, the number of UEs initiating a random access (RA) procedure as a paging response to provide this feedback may be managed by the eNB. Note that given the low duty cycle of the configuration of the discovery zones, it would not be necessary for the eNB to request for this feedback from all RRC_IDLE mode UEs at the same paging subframe to estimate the amount of loading of the discovery zones. Since the silencing factor may be configured by the eNB, its impact may be factored in by the eNB in deriving this estimate.

The request for the feedback on number of transmissions in the past N discovery zones may be added to the paging message and enabled by the eNB when it requires a UE or a set of UEs to report this metric. Additionally, the number of RRC_CONNECTED mode UEs participating in D2D discovery may be known to the eNB by using the above mechanism or via feedback requests indicated via dedicated RRC or MAC CE signaling.

In some other embodiments, a UE may report discovery related metrics or measurement reporting similar to Minimization Driving Test (MDT) or as a part of MDT reporting. In idle mode, the UE stores and accumulates the measurement and reports the logged measurement once the UE is connected. In connected mode, the UE can report discovery related measurement in a periodic or event-triggered manner. Since reporting is not immediate in case of idle mode, time stamp that indicates the moment of logging measurement results may need to be included. In addition, the detailed location related information (e.g. cell index or GPS information) may be also included. For discovery related metrics or measurements, as described above, the number of transmissions in the past N discovery zones may be reported. Alternatively, the interference level or the number of successfully detected D2D discovery packet transmissions may be reported. For instance, assuming discovery packet transmissions using randomly selected DM-RS base sequences and/or cyclic shifts (for PUSCH-based discovery packet transmission), the UEs can report the number of blindly detected unique DM-RS sequences or cyclic shifts summed or averaged over the most recent N1 D2D discovery zone, where N1 may be pre-determined or configurable.

Figure 3B:
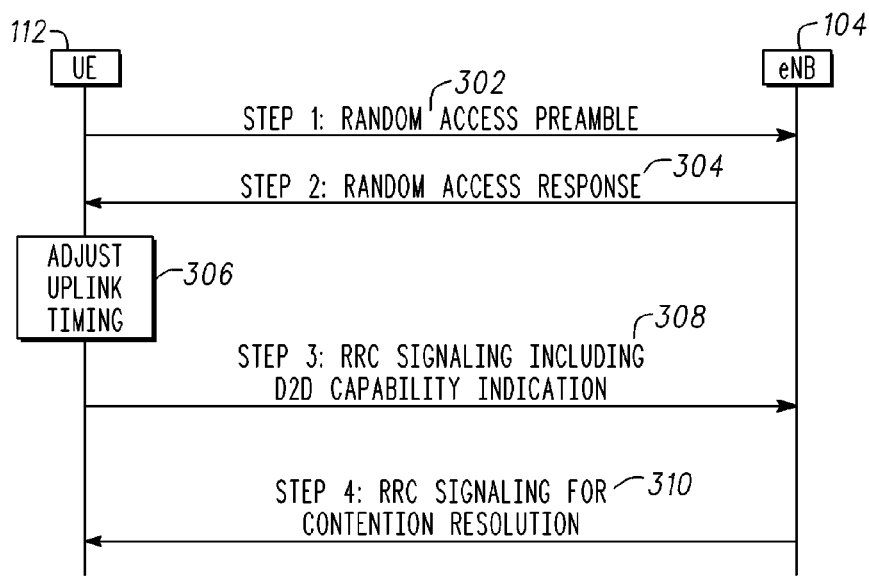
FIG. 3B illustrates the use of a random-access channel (RACH) to count ProSe-enabled UEs in accordance with some embodiments.

FIG. 3B illustrates the use of a random-access channel (RACH) to count ProSe-enabled UEs in accordance with some embodiments. In these embodiments, the eNB 104 may determine the number of ProSe-enabled UEs 102 based on radio-resource control (RRC) signaling (operation 308) received from the ProSe-enabled UEs 102 during a contention-based random access (CBRA) procedure 300 as part of an initial access procedure. The RRC signaling may, for example, include a D2D capability indication of the transmitting ProSe-enabled UE 102. In these embodiments, the eNB 104 may determine whether or not to make changes to a resource allocation configuration for D2D activities based on the discovery zone loading metrics and the number of ProSe-enabled UEs 102 determined based on the RRC signaling.

In these embodiments, the RACH is used for D2D UEs counting: Counting of ProSe-enabled (i.e., D2D capable) UEs is performed during UE's initial Contention-Based Random Access (CBRA) procedure (operations 302, 304, 306, 308 and 310). In these embodiments, a UE's ProSe-capability may be included in the message transmitted operation 308. These embodiments may be used to count RRC_CONNECTED as well as RRC_IDLE mode UEs.

Figure 4:
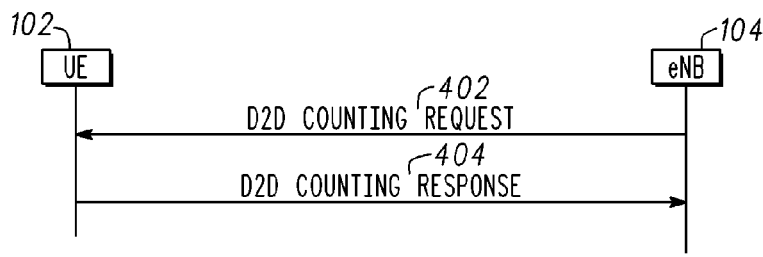
FIG. 4 illustrates a procedure for counting ProSe-enabled UEs for UEs in radio-resource control (RRC) connected mode.

FIG. 4 illustrates a procedure for counting ProSe-enabled UEs for UEs in radio-resource control (RRC) connected mode. In these embodiments, an eNB 104 may be configured to transmit a D2D counting request message (operation 402) and receive a D2D counting response message (operation 404) from ProSe-enabled UEs 102 that are in radio-resource control (RRC) connected mode. In these embodiments, the D2D counting response message 404 may indicate that the responding UE is a ProSe-enabled UE allowing the eNB 104 to coarsely estimate the number of ProSe-enabled UEs based on the number of D2D counting response messages 404 that are received. In some of these embodiments, a D2D counting response message 404 may be indicate that a UE in RRC connected mode is not ProSe-enabled.

In some embodiments, the D2D counting request message (operation 402) may include plurality of dedicated RACH preambles allocated for D2D counting and the D2D counting response message (operation 404) may comprise one of the RACH preambles selected by a ProSe-enabled UE 102 and transmitted within an assigned access slot (e.g., a RACH time/frequency resource).

In these embodiments, a set of dedicated RACH preambles may be included in D2D counting request message. Upon receiving a counting request from the network for D2D counting purpose, a D2D-capable UE responds by sending a RACH preamble selected from the pool of RACH preambles allocated for D2D UE counting purpose; the UE transmits the selected preamble on the assigned access slot (RACH channel time/frequency resource). Note that, a relatively coarse estimation of the number of D2D-capable UEs may be sufficient to determine whether D2D discovery resources need to added or reduced compared to the current configuration (that may be achieved by comparing to a certain threshold number that relates to the current D2D resource configuration). A very accurate counting of larger numbers of UEs is not necessary. Therefore by allocating a number of preamble signature-timeslot combinations similar to or only a little greater than this threshold number, it is straightforward to derive the required information.

In these embodiments, counting the D2D capable UEs in RRC_CONNECTED mode might be sufficient in some cases for optimized discovery resources allocation due to the fact that discovery signal resources is typically allocated in a semi-static manner and any RRC_IDLE Mode D2D capable UE has to use the contention-based resources for D2D discovery due to lack of RRC context in the radio-access network. The network has the capability to gradually adjust the resources according to the detected statistics of the D2D resource utilization and the likelihood of collisions. Therefore, as defined as part of the MBMS counting procedure, the E-UTRAN first initiates the procedure by sending a D2DCountingRequest message. Upon receiving the D2DCountingRequest message, the UE capable of D2D discovery in RRC_CONNECTED mode shall transmit a D2DCountingResponse message.

In some embodiments, an eNB may determine the number of ProSe-enabled UEs 102 based on RRC messages indicating discovery resource release transmitted by ProSe-enabled UEs in RRC connected mode. In some of these embodiments, ProSe-enabled UEs in RRC_CONNECTED mode can transmit an RRC message indicating discovery resource release even if they have not yet been configured with dedicated discovery resources. This information can assist the eNB in estimating the number of ProSe-enabled UEs in RRC_CONNECTED mode participating in D2D discovery, and can thereby optimize the resource allocation for RRC_CONNECTED mode UEs.

In some embodiments the eNB may determine the number of ProSe-enabled UEs 102 based on reception of periodic tracking area (TA) messages having a D2D capability indication transmitted by ProSe-enabled UEs in RRC idle mode. In these embodiments, ProSe-enabled UEs in RRC idle mode may be configured to add the D2D capability indication to the periodic tracking area (TA) messages.

In some embodiments, a ProSe-enabled UE may be configured to receive device-to-device (D2D) discovery zone configuration signaling from an enhanced node B (eNB) to indicate time and frequency resources and a periodicity of a discovery zone and to indicate one or more discovery zone operational parameters. In some embodiments, when a UE is in radio-resource control (RRC) idle mode (RRC_IDLE), the UE may transition to RRC connected mode (RRC_CONNECTED) to send a discovery resource request to the eNB. The UE may autonomously switch back to the RRC idle mode upon reception of a resource configuration message from the eNB, at least for transmission in a contention-based D2D discovery zone (CB-D2D DZ).

In some embodiments, an eNB 104 may be configured to exchange D2D discovery zone configuration information with one or more neighbor eNBs. The eNB 104 may be configured to signal the D2D discovery zone configuration information of the one or more neighbor eNBs to ProSe-enabled UEs (e.g., via SIB signaling). In these embodiments, a certain level of coordination between the neighboring eNBs may support of inter-eNB discovery, especially for the case of cell-specific configuration of D2D discovery zones. In some embodiments, eNBs 104 may exchange information on the configuration of D2D discovery zones in their respective cells. The D2D discovery configuration of a neighboring cell may be signaled to the UEs 102 by the respective serving cells. In some alternate embodiments, the serving cell may inform the UEs about the location of the relevant system information block (SIB) transmitted by the neighboring cells and the UEs may acquire the corresponding SIB and thereby know the D2D discovery zone configuration in neighboring cells. For both cases, it may be up to UE implementation, especially for UE-based open discovery, as to whether to transmit and/or listen on the D2D discovery zones (that do not overlap with its serving cell D2D discovery zone) of all the cells in its neighbor cell list or of only a selected subset thereof.

For network-common configuration of D2D discovery zones, constituent cells may be configured to maintain tight time-synchronization with respect to subframe boundary, subframe number (SFN), etc. to enable a common D2D discovery zone. This may be achieved, for instance, using backhaul-based synchronization or using GPS. In some embodiments, the requirements on tight time-synchronization may be relaxed by using an extended cyclic prefix (CP) for the D2D discovery zones and using a normal-length cyclic prefix for non-discovery zones.

For D2D discovery zones that are configured on a cell-specific basis, one challenge arises from the issue of coexistence of D2D discovery transmission/reception and cellular (WAN) traffic. Since the D2D discovery zones are configured in the currently defined UL subframes, the inter-cell interference between D2D discovery signal transmissions and UL PUSCH transmissions may be managed, for example, by UL scheduling and UL power control for PUSCH transmissions, incorporating some form of transmit power control (e.g., by configuring the maximum transmit power) for transmission of discovery signals, employing a cell-clustering approach, and/or the selection of discovery resources by the UE based on UE geometry. These embodiments are discussed in more detail below.

In some embodiments, to signal the D2D discovery zone configuration information of the one or more neighbor eNBs, the eNB 104, when operating as a serving eNB is configured to provide location information for system information blocks (SIB) transmitted by one or more neighboring eNBs to allow UEs being served by the serving eNB to acquire the SIBs, the SIBs indicating D2D discovery zone configuration for the one or more neighboring eNBs. In these embodiments, it may be up to the UE implementation, especially for UE-based open discovery, as to whether to transmit and/or listen on the D2D discovery zones (that do not overlap with its serving cell D2D discovery zone) of all the cells in its neighbor cell list of only a selected subset thereof. In these embodiments, the UE may receive the signaling from a serving eNB when in RRC connected mode and may receive the signaling from an eNB that the UE is camping on when the UE is in RRC idle mode. In accordance with embodiments, a UE has a serving eNB when in RRC connected mode, while when in RRC idle mode, the UE camps on an eNB (since it is not being service by an eNB when in idle).

In some embodiments, an eNB 104 is configured to exchange D2D discovery zone configuration information one or more neighbor eNBs. Based the D2D discovery zone configuration information of the one or more neighbor eNBs, the eNB 104 may be configured to engage in an inter-cell interference reduction technique to reduce intra-cell and inter-cell interference within the discovery zone and inter-cell interference between discovery signal transmissions and uplink cellular transmissions. The inter-cell interference reduction technique include one or more of:

performance of cooperative subframe power control for D2D discovery signal transmissions wherein uplink subframe sets are configured with separate power control parameters for interference reduction between the uplink cellular transmissions (e.g., physical uplink shared channel (PUSCH) transmissions) and the D2D discovery signal transmissions;

configuration of transmit power control levels for transmission of discovery signals;

employment of cooperative cell clustering to align discovery zones of the one or more neighbor eNBs; and employment of geometry-based intra-cell discovery zone partitioning.

Figure 5:
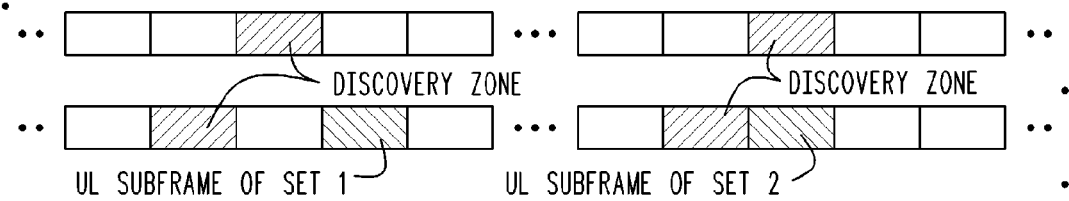
FIG. 5 illustrates cooperative uplink subframe power control for D2D discovery signal transmission in accordance with some embodiments.

FIG. 5 illustrates cooperative uplink subframe power control for D2D discovery signal transmission in accordance with some embodiments. In some of these embodiments, UL scheduling and UL power control for PUSCH transmissions may be configured by the serving cell as the configuration of the D2D discovery zone in the neighboring cells is known by the serving cell. In some embodiments, two UL subframe sets may be configured to have separate power control parameters (e.g. open-loop power control parameters PO and alpha) for different UL subframe sets. This may avoid strong inter-cell interference from cellular PUSCH transmission to D2D discovery signal reception of neighboring cell by using one UL subframe set to cover the D2D discovery resources of neighboring cell(s) as illustrated in FIG. 5.

Some embodiments may incorporate a form of transmit power control (e.g., by configuring the maximum transmit power) for transmission of discovery signals. In some embodiments, multiple maximum power classes for D2D discovery signal can predefined and the selected maximum transmit power level may be signaled to UE through D2D discovery configuration signaling.

Some embodiments may employ a cell-clustering approach whereby neighboring cells align their D2D discovery zone configurations via information exchange via X2 115 (FIG. 1). In these embodiments, only the time-frequency resources reserved for D2D discovery zones may need to be aligned and each cell can configure a silencing factor (discussed in more detail below) independently to adjust for variations in the loading of the D2D discovery zones to manage intra-cell/intra-cluster interference within the D2D discovery zones.

In some embodiments, the discovery zone operational parameters may include at least one of a silencing factor, a transmit power control configuration, hopping related parameters and a scrambling ID. In these embodiments, irrespective of the type of D2D discovery operation: open or restricted discovery, for RRC_CONNECTED or RRC_IDLE ProSe-enabled UEs, certain parameters related to configuration and transmission of discovery zones and signals (e.g., discovery packets) may be signaled to the corresponding UEs.

In these embodiments, the discovery zone configuration may include any partitioning of the overall zone into contention-based and contention-free discovery zones. Parameters may be included to indicate the extent of each discovery zone in the time and frequency domains, and may indicate a time offset and a periodicity of the configuration of the zones. For a cell-specific discovery zone allocation, this information would be cell specific and a serving cell may signal the parameters corresponding to the neighboring cells to support inter-eNB discovery.

In some embodiments, if fixed random silencing is configured, a single value for the silencing factor may be signaled. On the other hand, for support of more advanced adaptive silencing mechanisms, more than one parameter may need to be signaled. In one embodiment, each ProSe-enabled UE 102 may be configured with a nominal silencing factor that is applied for the first occurrence of the discovery zone for the respective UE. For the subsequent discovery zone occurrences, the silencing factor to be applied by the UE may be incremented or decremented within certain lower and upper bounds (by certain factors signaled by the network/eNB) depending on whether the UE transmitted in the previous zone or not. The bounds may either be static (preconfigured) or configured and updated by the network and/or the eNB at a very slow rate, although the scope of the embodiments is not limited in this respect.

In some embodiments, the eNB may be configured to reduce interference within the discovery zone by employing a silencing and muting protocol for discovery signal transmissions and configured to include the silencing factor in the discovery zone parameters. In these embodiments, the silencing and muting protocol configures the ProSe-enabled UEs with the silencing factor for use in D2D discovery signal transmission on randomly selected resources of the D2D discovery zone based on probability indicated by the silencing factor. The effective arrival rate of the discovery packets and thereby the interference level within the D2D discovery zones may be controlled. In these embodiments, each ProSe-enabled UE that intends to transmit a discovery packet may randomly selects a resource from within the D2D discovery zone and may transmit the packet with a certain probability (e.g., $(1-p)$, with $0 \leq p \leq 1$). In these embodiments, p may be defined as the silencing factor or transmission probability factor that is configured by the network, either in a network-common manner or in a cell-specific manner by individual serving cells.

In some embodiments, the signaling to the UE indicates that the silencing factor is to be either incremented or decremented for use in subsequent occurrences of the discovery zone depending on whether the UE transmitted D2D discovery zones in a prior occurrence of the discovery zone.

In some embodiments, when the discovery zone parameters comprise include the transmit power control configuration, a UE may be configured with a maximum transmit power for transmission of D2D discovery signals that is lower than a transmit power specified by a respective UE category. In these embodiments, depending on the discovery traffic conditions and use cases, ProSe-enabled UEs may be configured with a maximum transmit power that may be lower than that specified by the respective UE category. The maximum transmit power may be applied for discovery packet transmission. If supported, additional parameters related to more advanced adaptive power control options would need to be signaled as well.

In some embodiments, when the discovery zone parameters comprise include the hopping related parameters, the hopping related parameters indicate:
   parameters for discovery resource hopping in a contention-free D2D discovery zone configuration;
   a hopping type comprising either type 1 or type 2 hopping;
   a hopping mode comprising either intra-subframe or inter-subframe hopping;
   a subband size for the type 2 hopping; and
   a pseudorandom sequence initialization for the type 2 hopping.

In these embodiments, for contention-free discovery resource allocations, certain randomized hopping related signaling may be provided to the UE. Further, for payload-based transmissions wherein the each discovery packet transmission spans multiple PRB-pairs, different types of intra- or inter-subframe hopping may be configured.

In some embodiments, when the discovery zone parameters comprise include the scrambling identity, the scrambling identity may to be used for scrambling of a CRC mask of the D2D discovery packets. A common scrambling ID may be assigned per discovery group. In these embodiments, a scrambling Identity (ID) may be used for scrambling of the CRC mask of the discovery packets. The scrambling identity may be common per discovery group. For open discovery, all ProSe-enabled UEs within the network (for network-common discovery resource configuration) or within cells or cell-clusters (for cell-specific discovery resource configuration) may be configured with a common scrambling ID.

For restricted discovery, the scrambling ID may be used for filtering of decoded candidates by the discovering UE before sending the list of candidates to the upper layers for verification for restricted discovery. For closed discovery, the scrambling is the same on a per-white list basis for restricted discovery. In this way, those ProSe-enabled UEs that are not on white list will not be able to decode the packet. The closed group scrambling seed should be generated by the D2D server, and sent together with the white list group information during D2D registration (not through SIB/paging).

In some embodiments, for restricted discovery, a temporary identifier (Temp_ID) may be used to differentiate the same ProSe-enabled UE belonging to different discovery groups (different white lists of other ProSe-enabled UEs). Each ProSe-enabled UE transmitting as part of restricted discovery is assigned with one or more Temp_IDs that replace the UE identity in the discovery packet. When a discovering UE decodes such a packet, it forwards the decoded Temp_ID(s) to the network for further identification and verification as part of the restricted discovery process. For example, consider three ProSe-enabled UEs participating in restricted discovery: UE_A, UE_B, and UE_C. UE_A and UE_B belong to distinct groups A and B respectively and don not have each other in their respective white lists, while UE_C is in both the white lists. Then, UE_C may be assigned two distinct Temp_IDs (UE_Ca and UE_Cb) such that both UE_A and UE_B can discover UE_Ca and UE_Cb respectively, and thereby, with subsequent identification from the network, can discover UE_C. However, UE_A and UE_B can only discover each other via open discovery operation.

Figure 6:
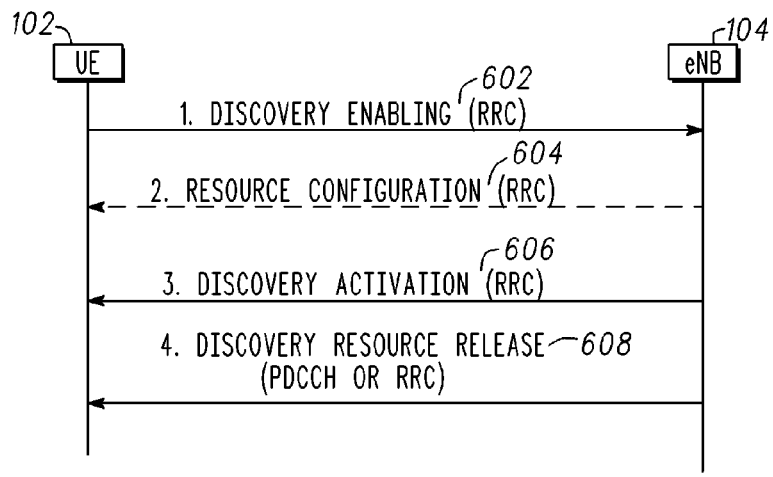
FIG. 6 illustrated eNB-triggered contention-free D2D discovery zone resources in accordance with some embodiments.

FIG. 6 illustrated eNB-triggered contention-free D2D discovery zone resources in accordance with some embodiments. In these embodiments, an eNB may use RRC and/or Layer 1 (physical layer) signaling to indicate a semi-persistent allocation of discovery resources to a ProSe-enabled UE in RRC connected mode for contention-free transmission of D2D discovery signals. The eNB may be configured to release the allocation of discovery resources by transmission of a discovery resource release. In these embodiments, contention-free mode of D2D discovery may be supported in multiple ways. In some embodiments, this mode of operation may be triggered by the eNB (operation 602) in which the eNB configures one or more RRC_CONNECTED mode ProSe-enabled UEs with dedicated resources for transmission of discovery signals in operation 604. The resource allocation in this case may be realized in the form of semi-persistent allocation of discovery resources using a combination of RRC and Layer 1 signaling (operation 606). The configured dedicated resources may also be released (operation 608) by the eNB depending on the loading and overall D2D discovery resource allocation state.

Figure 7:
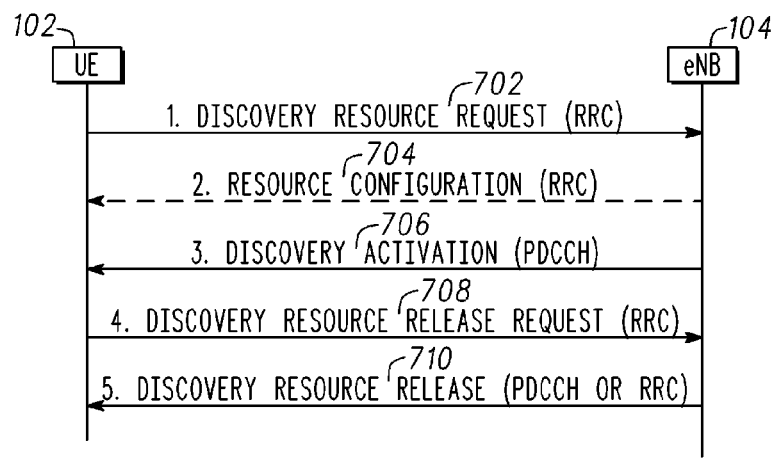
FIG. 7 illustrated UE-triggered contention-free D2D discovery zone resources in accordance with some embodiments.

FIG. 7 illustrated UE-triggered contention-free D2D discovery zone resources in accordance with some embodiments. In these embodiments, an eNB may allocate discovery resources to a ProSe-enabled UE in RRC connected mode for contention-free transmission of D2D discovery signals in response to a RRC resource request from the ProSe-enabled UE. In addition to eNB-decided discovery resource release, the eNB may release the allocation of discovery resources in response to reception of a resource release request via RRC signaling from the ProSe-enabled UEs. In these embodiments, an RRC_CONNECTED UE, for example, on initiation from higher layers, may request (operation 702) the serving cell for resources for D2D discovery signal transmissions via RRC layer. Subsequently, subject to eNB decision, the serving cell may configure the UE via RRC signaling with the configuration of the resource allocation (operation 704) and eventually semi-persistent allocations via Layer 1 signaling. The layer 1 signaling/activation is no used since resources may be configured via RRC (operation 704) and then the discovery transmission automatically gets activated starting from the next occurrence of the discovery resource pool/zone (operation 706). In addition to eNB-decided release of the resources (operation 710), a UE can also request for discovery resource release via RRC layer (operation 708).

In these embodiments, when the D2D discovery resources are explicitly allocated via PDCCH, the RRC resource configuration (operation 704) may not be required. Combinations of eNB-triggered, UE-triggered contention-free resource allocation schemes with eNB-decided and UE-requested resource release mechanisms may be realized as well.

Additionally, resources for D2D discovery may not be reserved (i.e., no discovery zones configured) at a cell-/cell-cluster-level or network-level depending on presence of active ProSe-enabled UEs. In such a situation, a ProSe-enabled UE in RRC_CONNECTED mode can send a request for allocation of D2D discovery resources via RRC or application layer. If it is requested via application layer, this request will be sent to D2D server which, in turn, requests the eNB to turn on discovery zone or allocate additional resources for contention-free discovery as required. Also, a ProSe-enabled UE in RRC_IDLE mode can transit to connected mode to send discovery resource request. However, it may not involve RRC connection set up. For example, the UE can send RRC connect request only indicating discovery zone request. Alternatively, the UE autonomously goes to idle mode when the eNB sends acknowledgement (or discovery radio resource configuration) message for the discovery request message.

In some embodiments, D2D discovery resources may be statically provisioned. For support of D2D discovery for national security and public safety (NSPS) use cases in outside or partial network coverage scenarios, certain periodic time-frequency resources may be pre-configured for the public safety (PS) ProSe-enabled UEs as D2D discovery resources. Such resources could be configured to have a low duty cycle and under appropriate conditions, depending on the exact D2D discovery protocol, additional resources may be allocated to supplement the preconfigured D2D discovery zones by coordinating UEs for partial or outside network coverage scenarios. The configuration of the additional resources can follow the principles outlined above with consideration of the presence of the statically preconfigured default D2D discovery zones.

In some embodiments, for geometry-based intra-cell D2D discovery zone partitioning, a UE may receive signaling from a serving eNB indicating D2D discovery zone configuration information of one or more neighbor eNBs including discovery resources of the D2D discovery zone used for at least one of cell-center D2D UEs and cell edge D2D UEs. The UE may select resources indicated for cell-center D2D UEs or cell edge D2D UEs for transmission of D2D discovery signals based at least on an RSRP of a serving eNB. In these embodiments, a UE may select a discovery resource based on UE geometry. The discovery zone may be divided and some of discovery resource is mainly used for cell-center UEs if these discovery resources are used for normal UL scheduling in neighboring cells. The ProSe-enabled UEs that have the ratio $RSRP_{serving}/RSRP_{strongest\_neighbor}$ greater than some pre-defined or configured threshold can transmit D2D discovery packets in the discovery zone reserved for cell-center ProSe-enabled UEs. In the above, $RSRP_{serving}$ is the serving cell RSRP and $RSRP_{strongest\_neighbor}$ corresponds to the RSRP for the link to the cell in the neighbor cell list with the maximum RSRP value. This geometry-based intra-cell D2D discovery zone partitioning coupled with careful scheduling of PUSCH transmissions in the cells with WAN traffic can enable co-existence of D2D discovery zones and LTE UL transmissions in neighboring cells. The eNBs can exchange information on the discovery resource used for cell center D2D UEs or cell edge D2D UEs. In some of these embodiments, the UE may selected the discovery resource based on $RSRP_{serving}$ instead of the ratio and would work similarly, especially in NWs with eNBs with similar transmission power (e.g., for macro-only networks).

Figure 8:
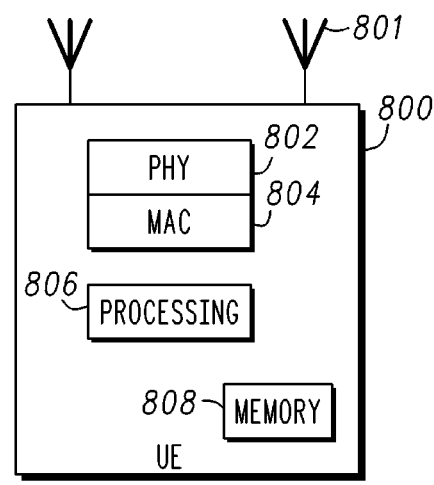
FIG. 8 illustrates a functional block diagram of a wireless communication device in accordance with some embodiments.

FIG. 8 illustrates a functional block diagram of a wireless communication device in accordance with some embodiments. Wireless communication device (WCD) 800 may be suitable for use as a UE 102 (FIG. 1) or an eNB 104 FIG. 1). The WDC 800 may include physical layer (PHY) circuitry 802 for transmitting and receiving signals to and from other WDCs (eNBs and UEs) using one or more antennas 801 as well as for D2D communications with other UEs. WDC 800 may also include medium access control layer (MAC) circuitry 804 for controlling access to the wireless medium. WDC 800 may also include processing circuitry 806 and memory 808 arranged to configure the various elements of the WDC 800 to perform the various operations described herein.

In some embodiments, the mobile device may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The antennas 801 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the mobile device is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An enhanced node B (eNB) comprising hardware processing circuitry configured to:
   transmit signaling to indicate a device-to-device (D2D) discovery zone configuration to proximity service (ProSe) enabled user equipment (UE), the signaling to indicate time and frequency resources and a periodicity of a discovery zone and to indicate operational parameters for the discovery zone,
   wherein the resources of the D2D discovery zone are allocated for D2D discovery signal transmission by the ProSe-enabled UEs;

receive discovery zone loading metrics, the discovery zone loading metrics based on monitoring of discovery signals within the discovery zone by one or more ProSe-enabled UEs; and make changes to a resource allocation configuration for D2D activities based on the discovery zone loading metrics, wherein the signaling for the D2D discovery zone configuration indicates one or more occurrences of the discovery zone, wherein the signaling is sent by the eNB either using dedicated radio-resource control (RRC) signaling or sent using common radio-resource control (RRC) signaling via system information blocks (SIBs), wherein the eNB is configured to receive D2D discovery zone configuration information of one or more neighbor eNBs, and wherein the eNB is configured to signal the D2D discovery zone configuration information of the one or more neighbor eNBs to the ProSe enabled UEs via SIB signaling.

2. The eNB of claim 1 wherein when the signaling sent by the eNB uses common RRC signaling via SIBs, the signaling sent by the eNB includes at least one of a SIB transmission and a paging transmission.

3. The eNB of claim 1 wherein the signaling for the D2D discovery zone configuration indicates at least one of:
a non-contention-based D2D discovery zone (NCB-D2D DZ) for which periodic resources are allocated for non-contention based transmission of discovery signals by only ProSe-enabled UEs in RRC connected mode; and
a contention-based D2D discovery zone (CB-D2D DZ) for which periodic resources are allocated for contention-based transmission of discovery signals by any ProSe-enabled UEs including ProSe-enabled UEs in RRC connected mode, RRC idle mode and out of coverage UEs.

4. The eNB of claim 1 wherein the eNB is configured to receive D2D discovery zone configuration information of one or more neighbor eNBs, and
wherein based on the D2D discovery zone configuration information of the one or more neighbor eNBs, the eNB is further configured to engage in an interference reduction technique to reduce intra-cell and inter-cell interference within the discovery zone and inter-cell interference between discovery signal transmissions and uplink cellular transmissions, the technique to include one or more of:
cooperative subframe power control for D2D discovery signal transmissions wherein uplink subframe sets are configured with separate power control parameters for interference reduction between the uplink cellular transmissions and the D2D discovery signal transmissions;
transmit power level control for the D2D discovery signal transmission;
cooperative cell clustering to align discovery zones of the one or more neighbor eNBs; and
geometry-based intra-cell discovery zone partitioning.

5. The eNB of claim 4 wherein the discovery zone operational parameters include at least one of a silencing factor, a transmit power control configuration, hopping related parameters and a scrambling ID.

6. The eNB of claim 5 wherein the eNB is further configured to reduce interference within the discovery zone by employing a silencing and muting protocol for discovery signal transmissions and configured to include the silencing factor in the discovery zone parameters, and
wherein the silencing and muting protocol configures the ProSe-enabled UEs with the silencing factor for use in D2D discovery signal transmission on randomly selected resources of the D2D discovery zone based on probability indicated by the silencing factor.

7. The eNB of claim 5 wherein when the discovery zone parameters comprise include the transmit power control configuration, the ProSe-enabled UEs are configured with a maximum transmit power for D2D discovery signal transmission that is lower than a transmit power specified by a respective UE category,
wherein when the discovery zone parameters include the hopping related parameters, the hopping related parameters indicate:
the parameters needed for discovery resource hopping in a contention-free D2D discovery zone;
a hopping type comprising either type 1 or type 2 hopping;
a hopping mode comprising either intra-subframe or inter-subframe hopping;
a subband size for the type 2 hopping; and
a pseudorandom sequence initialization for the type 2 hopping, and
wherein when the discovery zone parameters include the scrambling identity, the ProSe enabled UEs are configured to use the scrambling identity for scrambling of a cyclic-redundancy check (CRC) mask of the D2D discovery packets, and the eNB is configured to assign a common scrambling ID per discovery group.

8. The eNB of claim 1 wherein the signaling comprise one or more of radio-resource control (RRC) and Layer 1 signaling to indicate a semi-persistent allocation of discovery resources to the ProSe enabled UEs in RRC connected mode for contention-free transmission of D2D discovery signals, and
wherein the eNB is configured to release the allocation of discovery resources by transmission of a discovery resource release.

9. The eNB of claim 8 wherein the eNB allocates the discovery resources to the ProSe enabled UEs in RRC connected mode for contention-free transmission of D2D discovery signals in response to a RRC resource request from the ProSe enabled UE; and
wherein, the eNB is further configured to release the allocation of discovery resources in response to reception of a resource release request via RRC signaling from the ProSe enabled UEs.

10. The eNB of claim 1, wherein the resources of the D2D discovery zone comprise resources of a physical uplink shared channel (PUSCH).

11. An enhanced node B (eNB) comprising hardware processing circuitry and configured to:
transmit signaling to indicate a device-to-device (D2D) discovery zone configuration to proximity service (ProSe) enabled user equipment (UE), the signaling to indicate at least time and frequency resources and a periodicity of a discovery zone;
receive discovery zone loading metrics, the discovery zone loading metrics based on monitoring of discovery signals within the discovery zone by one or more ProSe-enabled UEs; and
make changes to a resource allocation configuration for D2D activities based on the discovery zone loading metrics, wherein the signaling for the D2D discovery zone configuration indicates one or more occurrences of the discovery zone,
wherein the signaling is sent by the eNB either using dedicated radio-resource control (RRC) signaling or sent using common radio-resource control (RRC) signaling via system information blocks (SIBs),
wherein based on the D2D discovery zone configuration information of the one or more neighbor eNBs, the eNB is further configured to engage in an interference reduction technique to reduce intra-cell and inter-cell interference within the discovery zone and inter-cell interference between discovery signal transmissions and uplink cellular transmissions, the technique to include one or more of:
cooperative subframe power control for D2D discovery signal transmissions wherein uplink subframe sets are configured with separate power control parameters for interference reduction between the uplink cellular transmissions and the D2D discovery signal transmissions;
transmit power level control for the D2D discovery signal transmission;
cooperative cell clustering to align discovery zones of the one or more neighbor eNBs; and
geometry-based intra-cell discovery zone partitioning.

12. The eNB of claim 11 wherein the discovery zone metrics include at least one of:
a number of discovery signal transmissions in a number of occurrences of the discovery zone;
a number of successfully detected discovery signals in a number of occurrences of the discovery zone; and
an indication of the interference level in a number of occurrences of the discovery zone;
wherein the eNB is further configured to determine a number of the ProSe enabled UEs based on the discovery zone loading metrics.

13. The eNB of claim 11 wherein the eNB is further configured to determine the number of the ProSe enabled UEs based on radio-resource control (RRC) signaling received from the ProSe enabled UEs during a contention-based random access (CBRA) procedure as part of an initial access procedure,
wherein the RRC signaling includes a D2D capability indication.

14. The eNB of claim 11 further configured to:
transmit a D2D counting request message; and
receive a D2D counting response message from the ProSe enabled UEs that are in radio-resource control (RRC) connected mode.

15. The eNB of claim 11 wherein the eNB is further configured to determine the number of the ProSe enabled UEs based on reception of periodic tracking area (TA) messages having a D2D capability indication transmitted by the ProSe-enabled UEs that are in RRC idle mode.

16. User Equipment (UE) enabled for proximity services (ProSe), the ProSe-enabled UE comprising hardware processing circuitry and configured to:
receive device-to-device (D2D) discovery zone configuration signaling from an enhanced node B (eNB) to indicate time and frequency resources and a periodicity of a discovery zone and to indicate one or more discovery zone operational parameters; and
transmit D2D discovery signals within the resources to discover one or more other ProSe-enabled UEs; and
transmit, to an enhanced nodeB (eNB), discovery zone loading metrics, the discovery zone loading metrics based on monitoring of discovery signals within the discovery zone by one or more ProSe-enabled UEs for making changes, at the eNB, to a resource allocation configuration for D2D activities based on the discovery zone loading metrics,
wherein the UE is configured to receive signaling from the eNB indicating D2D discovery zone configuration information of one or more neighbor eNBs, and
wherein the UE is further configured to:
transmit D2D discovery signals in an indicated D2D discovery zone of the one or neighbor eNBs, and
monitor the indicated D2D discovery zone of the one or neighbor eNBs for D2D discovery signals.

17. The UE of claim 16 wherein when the UE is in radio-resource control (RRC) idle mode (RRC_IDLE), the UE is configured to transition to RRC connected mode (RRC_CONNECTED) to send a discovery resource request to a serving eNB, and
wherein the UE is further configured to autonomously switch back to the RRC idle mode upon reception of a resource configuration message from the serving eNB; at least for transmission in a contention-based D2D discovery zone (CB-D2D DZ).

18. The UE of claim 16 wherein the signaling for the D2D discovery zone configuration indicates one or more occurrences of the discovery zone and is sent by the eNB either using dedicated radio-resource control (RRC) signaling or using common radio-resource control (RRC) signaling via system information blocks (SIBs),
wherein the UE is further configured to
monitor the discovery zone for D2D discovery signals transmitted by other UEs; and
report discovery zone loading metrics to the eNB based on the monitored discovery signals, and
wherein the discovery zone loading metrics comprise one or more of:
a count of the number of D2D discovery signals transmitted by other UEs during a number of occurrences of the discovery zone;
a count of the number of D2D discovery signals transmitted by itself during a number of occurrences of the discovery zone; and
an indication of interference level in a number of occurrences of the discovery zone.

19. The UE of claim 18 wherein when the signaling for the discovery zone configuration indicates a periodic occurrence of the discovery zone for which periodic discovery-zone resources are allocated for D2D discovery, the UE is further configured to:
monitor a number of the occurrences of the discovery zone for D2D discovery signals transmitted by other UEs; and
report the discovery zone loading metrics to the eNB based on the D2D discovery signals monitored in the occurrences of the discovery zone.

20. The UE of claim 18 wherein the signaling for the D2D discovery zone configuration is configured to indicate at least one of:
a non-contention-based D2D discovery zone (NCB-D2D DZ) for which periodic resources are allocated for non-contention based transmission of discovery signals by ProSe-enabled UEs in RRC connected mode; and
a contention-based D2D discovery zone (CB-D2D DZ) for which periodic resources are allocated for contention-based transmission of discovery signals by the ProSe-enabled UEs including ProSe-enabled UEs in RRC connected mode, RRC idle mode and out of coverage ProSe-enabled UEs, wherein the UE is configured to monitor any signaled of the NCB-D2D DZs and CB-D2D DZs for discovery signals transmitted by other UEs.

21. The UE of claim 18 wherein the discovery signal transmissions include a demodulation reference signal (DMRS) sequence comprising a randomly selected choice of at least one of a base sequence, a cyclic shift value and an orthogonal cover code, and wherein the discovery zone metrics further include a number of blindly detected unique DMRS sequences.

22. The UE of claim 16 wherein the UE wherein for geometry-based intra-cell D2D discovery zone partitioning the UE is configured to receive signaling from the eNB indicating D2D discovery zone configuration information of a serving eNB and of one or more neighbor eNBs including discovery resources of the D2D discovery zone used for at least one of cell-center D2D UEs and cell edge D2D UEs; and wherein the UE is further configured to select resources indicated for cell-center D2D UEs or cell edge D2D UEs for transmission of D2D discovery signals based at least on a reference signal received power (RSRP) of the serving eNB.

23. A method performed by an enhanced node B (eNB) for signaling for device-to-device (D2D) discovery operations, the method comprising:

transmitting signaling to indicate a D2D discovery zone configuration to proximity service (ProSe) enabled user equipment (LE), the signaling to indicate time and frequency resources and a periodicity of a discovery zone and to indicate operational parameters for the discovery zone, wherein the resources of the D2D discovery zone are allocated for D2D discovery signal transmission by the ProSe-enabled UEs, wherein the signaling for the D2D discovery zone configuration indicates one or more occurrences of the discovery zone, and wherein the signaling is sent by the eNB either using dedicated radio-resource control (RRC) signaling or sent using common radio-resource control (RRC) signaling via system information blocks (SIBs);

receiving discovery zone loading metrics, the discovery zone loading metrics based on monitoring of discovery signals within the discovery zone by one or more ProSe-enabled UEs; and making changes to a resource allocation configuration for D2D activities based on the discovery zone loading metrics, wherein the signaling for the D2D discovery zone configuration indicates one or more occurrences of the discovery zone, wherein the signaling is sent by the eNB either using dedicated radio-resource control (RRC) signaling or sent using common radio-resource control (RRC) signaling via system information blocks (SIBs), wherein the eNB is configured to receive D2D discovery zone configuration information of one or more neighbor eNBs, and wherein the eNB is configured to signal the D2D discovery zone configuration information of the one or more neighbor eNBs to the ProSe enabled UEs via SIB signaling.

24. The method of claim 23 wherein when the signaling sent by the eNB uses common RRC signaling via SIBs, the signaling sent by the eNB includes at least one of a SIB transmission and a paging transmission, and wherein the discovery zone operational parameters include at least one of a silencing factor, a transmit power control configuration, hopping related parameters and a scrambling ID.

25. A non-transitory computer-readable storage medium that stores instructions for execution by one or more processors to configure an enhanced node B (eNB) for signaling for device-to-device (D2D) discovery operations, the operations to configure the eNB to:

transmit signaling to indicate a D2D discovery zone configuration to proximity service (ProSe) enabled user equipment (UE), the signaling to indicate time and frequency resources and a periodicity of a discovery zone and to indicate operational parameters for the discovery zone, wherein the resources of the D2D discovery zone are allocated for D2D discovery signal transmission by the ProSe-enabled UEs, wherein the signaling for the D2D discovery zone configuration indicates one or more occurrences of the discovery zone, and wherein the signaling is sent by the eNB either using dedicated radio-resource control (RRC) signaling or sent using common radio-resource control (RRC) signaling via system information blocks (SIBs);

receive discovery zone loading metrics, the discovery zone loading metrics based on monitoring of discovery signals within the discovery zone by one or more ProSe-enabled UEs; and make changes to a resource allocation configuration for D2D activities based on the discovery zone loading metrics, wherein the signaling for the D2D discovery zone configuration indicates one or more occurrences of the discovery zone, wherein the signaling is sent by the eNB either using dedicated radio-resource control (RRC) signaling or sent using common radio-resource control (RRC) signaling via system information blocks (SIBs), wherein the eNB is configured to receive D2D discovery zone configuration information of one or more neighbor eNBs, and wherein the eNB is configured to signal the D2D discovery zone configuration information of the one or more neighbor eNBs to the ProSe enabled UEs via SIB signaling.

26. The non-transitory computer-readable storage medium of claim 25 wherein when the signaling sent by the eNB uses common RRC signaling via SIBs, the signaling sent by the eNB includes at least one of a SIB transmission and a paging transmission, and wherein the discovery zone operational parameters include at least one of a silencing factor, a transmit power control configuration, hopping related parameters and a scrambling ID.

* * * * *

UNITED STATES PATENT AND TRADEMARK OFFICE
CERTIFICATE OF CORRECTION

PATENT NO. : 9,788,186 B2
APPLICATION NO. : 14/314957
DATED : October 10, 2017
INVENTOR(S) : Chatterjee et al.

It is certified that error appears in the above-identified patent and that said Letters Patent is hereby corrected as shown below:

On the Title Page

On page 4, in Column 1, item (56), under "Other Publications", Line 61, delete "T/US2014/050209," and insert --PCT/US2014/050209,-- therefor On page 5, in Column 1, item (56), under "Other Publications", Line 22, delete "fo r" and insert --for-- therefor In the Claims In Column 20, Line 13, in Claim 7, delete "LIE" and insert --UE-- therefor In Column 21, Line 34, in Claim 12, delete "zone;" and insert --zone,-- therefor In Column 22, Line 22, in Claim 17, delete "eNB;" and insert --eNB,-- therefor In Column 22, Line 31, in Claim 18, after "to", insert --:--

In Column 23, Line 20, in Claim 22, delete "UEs;" and insert --UEs,-- therefor

In Column 23, Line 32, in Claim 23, delete "(LE)," and insert --(UE),-- therefor Signed and Sealed this
Eleventh Day of June, 2019

Andrei Iancu
*Director of the United States Patent and Trademark Office*